United States Patent
Shin et al.

(10) Patent No.: US 11,844,111 B2
(45) Date of Patent: Dec. 12, 2023

(54) METHOD FOR TRANSMITTING MESSAGE FOR EXECUTION OF RANDOM ACCESS PROCEDURE IN WIRELESS COMMUNICATION SYSTEM AND APPARATUS THEREFOR

(71) Applicant: LG Electronics Inc., Seoul (KR)

(72) Inventors: Seokmin Shin, Seoul (KR); Changhwan Park, Seoul (KR); Joonkui Ahn, Seoul (KR); Suckchel Yang, Seoul (KR); Seunggye Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 371 days.

(21) Appl. No.: 16/762,748

(22) PCT Filed: Nov. 8, 2018

(86) PCT No.: PCT/KR2018/013559
§ 371 (c)(1),
(2) Date: May 8, 2020

(87) PCT Pub. No.: WO2019/093793
PCT Pub. Date: May 16, 2019

(65) Prior Publication Data
US 2021/0176788 A1 Jun. 10, 2021

Related U.S. Application Data

(60) Provisional application No. 62/634,208, filed on Feb. 23, 2018, provisional application No. 62/608,537, (Continued)

(51) Int. Cl.
*H04W 4/00* (2018.01)
*H04W 74/08* (2009.01)
(Continued)

(52) U.S. Cl.
CPC ..... *H04W 74/0833* (2013.01); *H04W 72/042* (2013.01); *H04W 72/0446* (2013.01); *H04W 72/0453* (2013.01); *H04W 74/008* (2013.01)

(58) Field of Classification Search
CPC ........... H04W 74/0833; H04W 72/042; H04W 72/0446; H04W 72/0453; H04W 74/008
See application file for complete search history.

(56) References Cited

U.S. PATENT DOCUMENTS

| | | | |
|---|---|---|---|
| 2010/0322096 A1* | 12/2010 | Hsu | H04W 74/002 370/252 |
| 2018/0139773 A1* | 5/2018 | Ma | H04W 72/1284 |

(Continued)

FOREIGN PATENT DOCUMENTS

| | | |
|---|---|---|
| JP | 2017139673 | 8/2017 |
| KR | 20080040553 | 5/2008 |

(Continued)

OTHER PUBLICATIONS

3GPP TSN RAN WG2 #95, Considerations of NPRACH transmission on non-anchor NB-IoT, Aug. 22-26, 2016, R2-164989 (Year: 2016).*

(Continued)

*Primary Examiner* — Siren Wei
(74) *Attorney, Agent, or Firm* — Fish & Richardson P.C.

(57) ABSTRACT

The present specification provides a method for transmitting, by a terminal, a message for execution of a random access procedure in a wireless communication system, the method comprising the steps of: receiving a system information block (SIB) from a base station; transmitting a first message, which is a random access preamble, to the base station on the basis of the SIB; receiving a second message, which is a response to the first message, from the base station; and transmitting a third message to the base station, (Continued)

using a carrier different from a carrier used to transmit the first message.

12 Claims, 13 Drawing Sheets

Related U.S. Application Data filed on Dec. 20, 2017, provisional application No. 62/582,954, filed on Nov. 8, 2017.

(51) Int. Cl.
*H04W 72/04* (2023.01)
*H04W 72/0446* (2023.01)
*H04W 72/0453* (2023.01)
*H04W 74/00* (2009.01)

(56) References Cited

U.S. PATENT DOCUMENTS

| | | | |
|---|---|---|---|
| 2018/0249511 A1* | 8/2018 | Rathonyi | H04W 74/006 |
| 2019/0037559 A1* | 1/2019 | Son | H04W 56/001 |
| 2019/0223212 A1* | 7/2019 | Xiao | H04W 74/008 |
| 2019/0387550 A1* | 12/2019 | Pan | H04W 74/0833 |

FOREIGN PATENT DOCUMENTS

| | | |
|---|---|---|
| KR | 1020110113484 | 10/2011 |
| KR | 1020120139820 | 12/2012 |
| KR | 1020130061628 | 6/2013 |
| WO | WO2017135347 | 8/2017 |

OTHER PUBLICATIONS

Ericsson, "Random Access on Non-Anchor Carriers in NB-Iot," R1-167431, Presented at 3GPP TSG-RAN WG1 #86, Gothenburg, Sweden, Aug. 22-26, 2016, 4 pages.

Extended European Search Report in European Appln. No. 18876481.5, dated Jul. 16, 2021.

Intel Corporation, "Considerations of NPRACH transmission on non-anchor NB-IoT," R2-164989, Presented at 3GPP TSG-RAN WG2 #95, Gothenburg, Sweden, Aug. 22-26, 2016, 5 pages.

Office Action in Korean Appln. No. 10-2020-7013896, dated Sep. 29, 2021, 11 pages (with English translation).

ASUSTeK, "Discussion on numerology of random access in NR," R2-1705313, 3GPP TSG-RAN WG2 Meeting #98, Hangzhou, China, dated May 15-19, 2017, 4 pages.

KR Office Action in Korean Appln. No. 10-2020-7013896, dated Mar. 3, 2021, 10 pages (with English translation).

* cited by examiner

FIG. 8
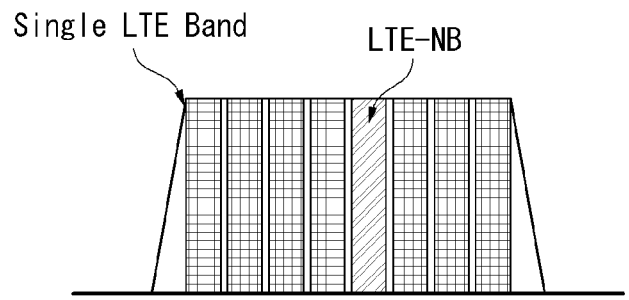
(a) In-band system
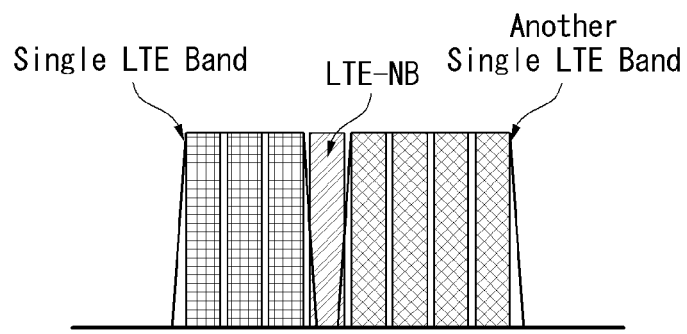
(b) Guard-band system
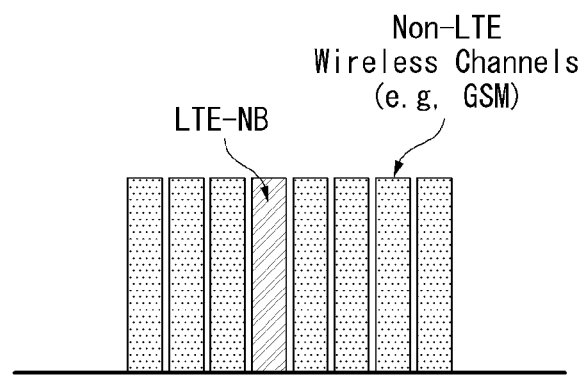
(c) Stand-alone system

METHOD FOR TRANSMITTING MESSAGE FOR EXECUTION OF RANDOM ACCESS PROCEDURE IN WIRELESS COMMUNICATION SYSTEM AND APPARATUS THEREFOR

CROSS-REFERENCE TO RELATED APPLICATIONS

This application is a National Stage filing under 35 U.S.C. 371 of International Application No. PCT/KR2018/013559, filed on Nov. 8, 2018, which claims the benefit of U.S. Provisional Application No. 62/582,954, filed on Nov. 8, 2017, U.S. Provisional Application No. 62/608,537, filed on Dec. 20, 2017, and U.S. Provisional Application No. 62/634,208, filed on Feb. 23, 2018, the contents of which are all hereby incorporated by reference herein in their entirety.

TECHNICAL FIELD

The disclosure relates to wireless communication systems and, particularly, methods and transmitting a message for performing a random access procedure and devices for the same.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DETAILED DESCRIPTION OF THE DISCLOSURE

Technical Problem

The disclosure aims to provide a method of transmitting a message for performing a random access procedure.

The disclosure also aims to provide a method of transmitting a first message and a third message for performing a random access procedure via different carriers.

Objects of the disclosure are not limited to the foregoing, and other unmentioned objects would be apparent to one of ordinary skill in the art from the following description.

Technical Solution

According to the disclosure, there is provided a method of transmitting a message for performing a random access procedure in a wireless communication system.

Specifically, a method of transmitting, by a user equipment (UE), a message for performing a random access procedure in a wireless communication system comprises receiving a system information block (SIB) from a base station, transmitting a first message to the base station based on the SIB, the first message being a random access preamble, receiving a second message from the base station, the second message being a response to the first message, and transmitting a third message to the base station using a carrier different from a carrier used to transmit the first message.

Further, in the disclosure, the method further comprises, before transmitting the first message, receiving downlink control information (DCI) from the base station through a physical downlink control channel (NPDCCH)

Further, in the disclosure, the carrier to transmit the third message is configured via the DCI or the second message.

Further, in the disclosure, the carrier to transmit the third message is configured via the SIB.

Further, in the disclosure, the SIB includes information for resources where the third message is transmittable, and the carrier to transmit the third message is determined by the DCI or the second message, based on the information.

Further, in the disclosure, the NPDCCH is for unicast transmission, and the third message is transmitted using a carrier used for uplink unicast.

Further, in the disclosure, a user equipment (UE) performing a method of transmitting a message for performing a random access procedure in a wireless communication system comprises a radio frequency (RF) module for transmitting/receiving a radio signal and a processor functionally connected with the RF module, wherein the processor is configured to receive a system information block (SIB) from a base station, transmit a first message to the base station based on the SIB, the first message being a random access preamble, receive a second message from the base station, the second message being a response to the first message, and transmit a third message to the base station using a carrier different from a carrier used to transmit the first message.

Further, in the disclosure, the processor receives downlink control information (DCI) from the base station through a physical downlink control channel (NPDCCH).

Further, in the disclosure, the carrier to transmit the third message is configured via the DCI or the second message.

Further, in the disclosure, the carrier to transmit the third message is configured via the SIB.

Further, in the disclosure, a method of transmitting, by a base station, a message for performing a random access procedure in a wireless communication system, comprises transmitting a system information block (SIB) from a user equipment (UE), receiving a first message from the UE based on the SIB, the first message being a random access preamble, transmitting a second message to the UE, the second message being a response to the first message, and receiving a third message from the UE using a carrier different from a carrier used to transmit the first message.

Further, in the disclosure, a base station performing a method of transmitting a message for performing a random access procedure in a wireless communication system comprises a radio frequency (RF) module for transmitting/receiving a radio signal, and a processor functionally connected with the RF module, wherein the processor is configured to transmit a system information block (SIB) to a user equipment (UE), receive a first message from the UE based on the SIB, the first message being a random access preamble, transmit a second message to the UE, the second message being a response to the first message, and receive a third message from the UE using a carrier different from a carrier used to transmit the first message.

Advantageous Effects

The disclosure transmits a first message and a third message for performing a random access procedure using different carriers, preventing collision of resources for random access.

Effects of the disclosure are not limited to the foregoing, and other unmentioned effects would be apparent to one of ordinary skill in the art from the following description.

BRIEF DESCRIPTION OF DRAWINGS

A more complete appreciation of the disclosure and many of the attendant aspects thereof will be readily obtained as the same becomes better understood by reference to the following detailed description when considered in connection with the accompanying drawings, wherein:

FIG. 8 is a view illustrating an NB-IoT operation mode to which the disclosure may apply.

MODE FOR CARRYING OUT THE DISCLOSURE

Figure 1:
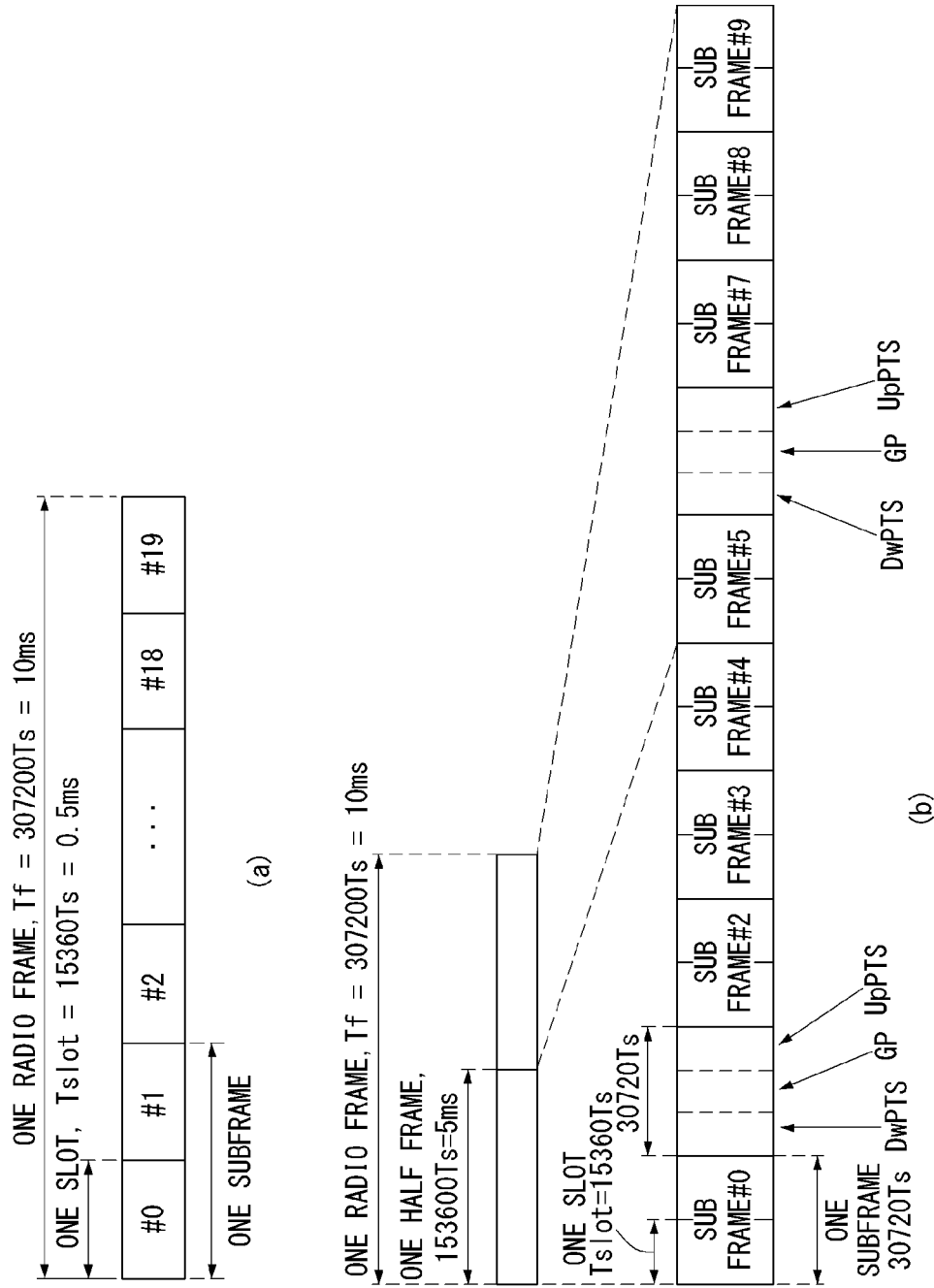
FIG. 1 illustrates a structure of a radio frame in a wireless communication system to which the disclosure may apply.

Some embodiments of the disclosure are described in detail with reference to the accompanying drawings. A detailed description to be disclosed along with the accompanying drawings are intended to describe some embodiments of the disclosure and are not intended to describe a sole embodiment of the disclosure. The following detailed description includes more details in order to provide full understanding of the disclosure. However, those skilled in the art will understand that the disclosure may be implemented without such more details.

In some cases, in order to avoid that the concept of the disclosure becomes vague, known structures and devices are omitted or may be shown in a block diagram form based on the core functions of each structure and device.

In this specification, a base station has the meaning of a terminal node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an eNB (evolved-NodeB), a Base Transceiver System (BTS), or an access point (AP). Furthermore, the device may be fixed or may have mobility and may be substituted with another term, such as User Equipment (UE), a Mobile Station (MS), a User Terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, or a Device-to-Device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the disclosure, and the use of such specific terms may be changed in various forms without departing from the technical sprit of the disclosure.

The following technologies may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and Non-Orthogonal Multiple Access (NOMA). CDMA may be implemented using a radio technology, such as Universal Terrestrial Radio Access (UTRA) or CDMA2000. TDMA may be implemented using a radio technology, such as Global System for Mobile communications (GSM)/General Packet Radio Service (GPRS)/Enhanced Data rates for GSM Evolution (EDGE). OFDMA may be implemented using a radio technology, such as Institute of Electrical and Electronics Engineers (IEEE) 802.11 (Wi-Fi), IEEE 802.16 (WiMAX), IEEE 802.20, or Evolved UTRA (E-UTRA). UTRA is part of a Universal Mobile Telecommunications System (UMTS). 3rd Generation Partnership Project (3GPP) Long Term Evolution (LTE) is part of an Evolved UMTS (E-UMTS) using evolved UMTS Terrestrial Radio Access (E-UTRA), and it adopts OFDMA in downlink and adopts SC-FDMA in uplink. LTE-Advanced (LTE-A) is the evolution of 3GPP LTE.

Embodiments of the disclosure may be supported by the standard documents disclosed in at least one of IEEE 802, 3GPP, and 3GPP2, that is, radio access systems. That is, steps or portions that belong to the embodiments of the disclosure and that are not described in order to clearly expose the technical spirit of the disclosure may be supported by the documents. Furthermore, all terms disclosed in this document may be described by the standard documents.

In order to more clarify a description, 3GPP LTE/LTE-A is chiefly described, but the technical characteristics of the disclosure are not limited thereto.

General System to which the Disclosure May be Applied

FIG. 1 shows the structure of a radio frame in a wireless communication system to which an embodiment of the disclosure may be applied.

3GPP LTE/LTE-A support a radio frame structure type 1 which may be applicable to Frequency Division Duplex (FDD) and a radio frame structure which may be applicable to Time Division Duplex (TDD).

The size of a radio frame in the time domain is represented as a multiple of a time unit of $T\_s=1/(15000*2048)$. A UL and DL transmission includes the radio frame having a duration of $T\_f=307200*T\_s=10$ ms.

FIG. 1(a) exemplifies a radio frame structure type 1. The type 1 radio frame may be applied to both of full duplex FDD and half duplex FDD.

A radio frame includes 10 subframes. A radio frame includes 20 slots of $T\_slot=15360*T\_s=0.5$ ms length, and 0 to 19 indexes are given to each of the slots. One subframe includes contiguous two slots in the time domain, and subframe i includes slot 2i and slot 2i+1. The time required for transmitting a subframe is referred to as a transmission time interval (TTI). For example, the length of the subframe i may be 1 ms and the length of a slot may be 0.5 ms.

A UL transmission and a DL transmission I the FDD are distinguished in the frequency domain. Whereas there is no restriction in the full duplex FDD, a UE may not transmit and receive simultaneously in the half duplex FDD operation.

One slot includes a plurality of Orthogonal Frequency Division Multiplexing (OFDM) symbols in the time domain and includes a plurality of Resource Blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of contiguous subcarriers in one slot.

FIG. 1(b) shows frame structure type 2.

A type 2 radio frame includes two half frame of $153600*T\_s=5$ ms length each. Each half frame includes 5 subframes of $30720*T\_s=1$ ms length.

In the frame structure type 2 of a TDD system, an uplink-downlink configuration is a rule indicating whether uplink and downlink are allocated (or reserved) to all subframes.

Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, in each subframe of the radio frame, 'D' represents a subframe for a DL transmission, 'U' represents a subframe for UL transmission, and 'S' represents a special subframe including three types of fields including a Downlink Pilot Time Slot (DwPTS), a Guard Period (GP), and an Uplink Pilot Time Slot (UpPTS).

A DwPTS is used for an initial cell search, synchronization or channel estimation in a UE. A UpPTS is used for channel estimation in an eNB and for synchronizing a UL transmission synchronization of a UE. A GP is duration for removing interference occurred in a UL owing to multi-path delay of a DL signal between a UL and a DL.

Each subframe i includes slot 2i and slot 2i+1 of $T\_slot=15360*T\_s=0.5$ ms.

The UL-DL configuration may be classified into 7 types, and the position and/or the number of a DL subframe, a special subframe and a UL subframe are different for each configuration.

A point of time at which a change is performed from downlink to uplink or a point of time at which a change is performed from uplink to downlink is called a switching point. The periodicity of the switching point means a cycle in which an uplink subframe and a downlink subframe are changed is identically repeated. Both 5 ms and 10 ms are supported in the periodicity of a switching point. If the periodicity of a switching point has a cycle of a 5 ms downlink-uplink switching point, the special subframe S is present in each half frame. If the periodicity of a switching point has a cycle of a 5 ms downlink-uplink switching point, the special subframe S is present in the first half frame only.

In all the configurations, 0 and 5 subframes and a DwPTS are used for only downlink transmission. An UpPTS and a subframe subsequent to a subframe are always used for uplink transmission.

Such uplink-downlink configurations may be known to both an eNB and UE as system information. An eNB may notify UE of a change of the uplink-downlink allocation state of a radio frame by transmitting only the index of uplink-downlink configuration information to the UE whenever the uplink-downlink configuration information is changed. Furthermore, configuration information is kind of downlink control information and may be transmitted through a Physical Downlink Control Channel (PDCCH) like other scheduling information. Configuration information may be transmitted to all UEs within a cell through a broadcast channel as broadcasting information.

Table 2 represents configuration (length of DwPTS/GP/UpPTS) of a special subframe.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | $2192 \cdot T_s$ | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

The structure of a radio subframe according to the example of FIG. 1 is just an example, and the number of subcarriers included in a radio frame, the number of slots included in a subframe and the number of OFDM symbols included in a slot may be changed in various manners.

Figure 2:
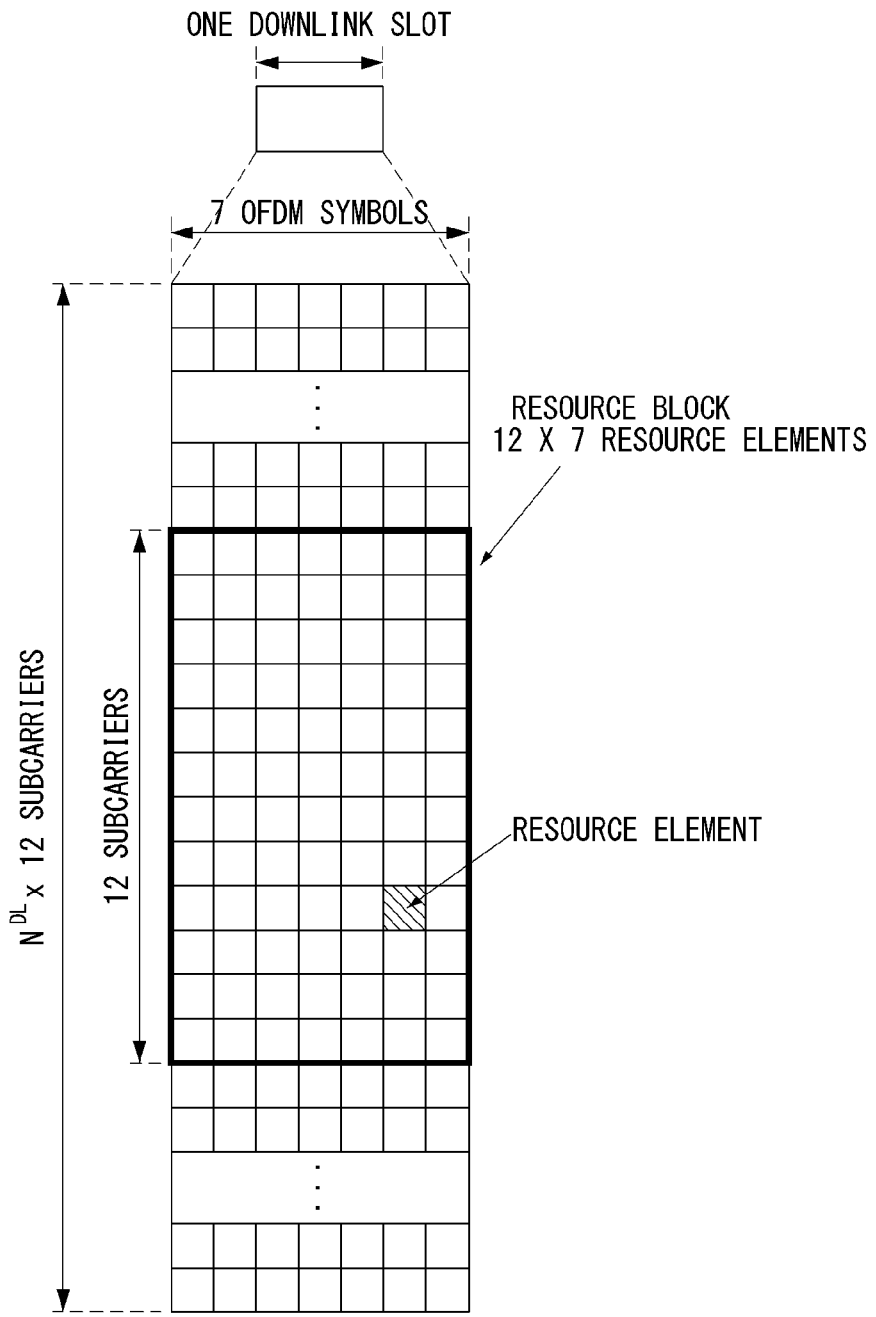
FIG. 2 is a view illustrating an example resource grid for one downlink slot in a wireless communication system to which the disclosure may apply.

FIG. 2 is a diagram illustrating a resource grid for one downlink slot in a wireless communication system to which an embodiment of the disclosure may be applied.

Referring to FIG. 2, one downlink slot includes a plurality of OFDM symbols in a time domain. It is described herein that one downlink slot includes 7 OFDMA symbols and one resource block includes 12 subcarriers for exemplary purposes only, and the disclosure is not limited thereto.

Each element on the resource grid is referred to as a resource element, and one resource block (RB) includes 12×7 resource elements. The number of RBs NADL included in a downlink slot depends on a downlink transmission bandwidth.

The structure of an uplink slot may be the same as that of a downlink slot.

Figure 3:
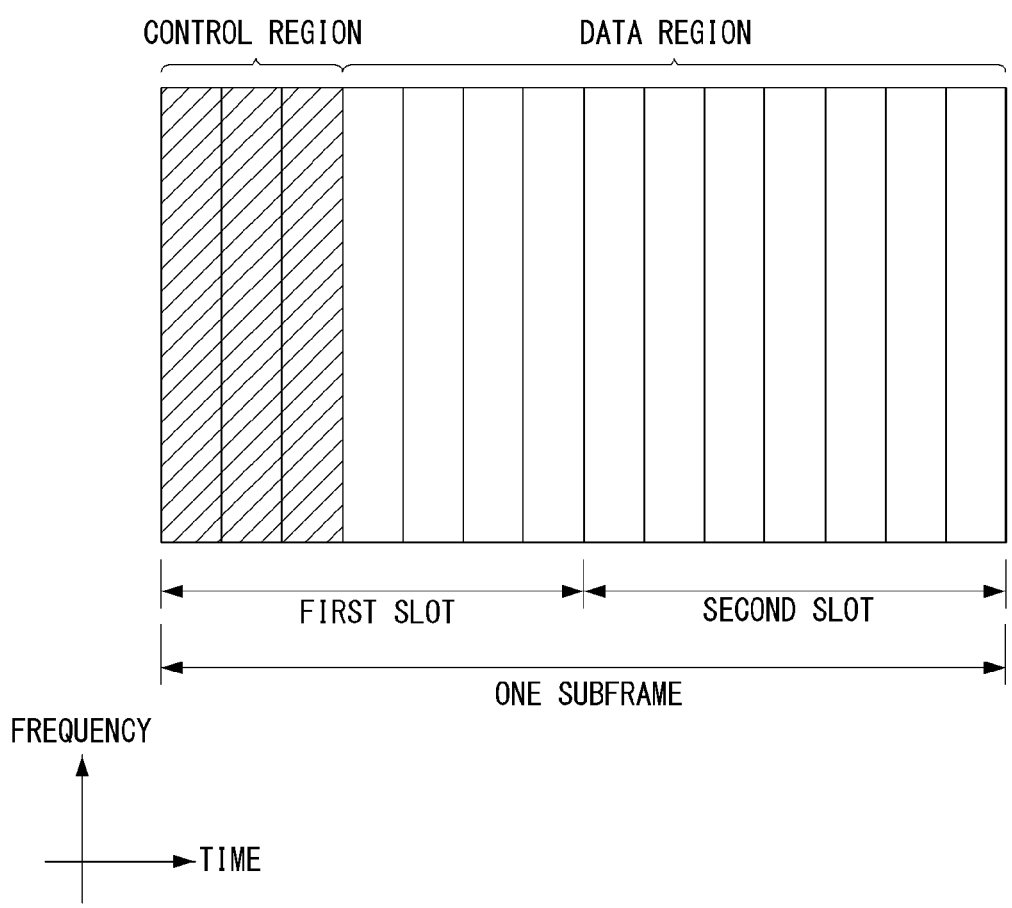
FIG. 3 illustrates a structure of a downlink subframe in a wireless communication system to which the disclosure may apply.

FIG. 3 shows the structure of a downlink subframe in a wireless communication system to which an embodiment of the disclosure may be applied.

Referring to FIG. 3, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARQ). Control information transmitted in a PDCCH is called Downlink Control Information (DCI). DCI includes uplink resource allocation information, downlink resource allocation information, or an uplink transmission (Tx) power control command for a specific UE group.

A PDCCH may carry information about the resource v and transport format of a downlink shared channel (DL-SCH) (this is also called an "downlink grant"), resource allocation information about an uplink shared channel (UL-SCH) (this is also called a "uplink grant"), paging information on a PCH, system information on a DL-SCH, the resource allocation of a higher layer control message, such as a random access response transmitted on a PDSCH, a set of transmission power control commands for individual UE within specific UE group, and the activation of a Voice over Internet Protocol (VoIP), etc. A plurality of PDCCHs may be transmitted within the control region, and UE may monitor a plurality of PDCCHs. A PDCCH is transmitted on a single Control Channel Element (CCE) or an aggregation of some contiguous CCEs. A CCE is a logical allocation unit that is used to provide a PDCCH with a coding rate according to the state of a radio channel. A CCE corresponds to a plurality of resource element groups. The format of a PDCCH and the number of available bits of a PDCCH are determined by an association relationship between the number of CCEs and a coding rate provided by CCEs.

An eNB determines the format of a PDCCH based on DCI to be transmitted to UE and attaches a Cyclic Redundancy Check (CRC) to control information. A unique identifier (a Radio Network Temporary Identifier (RNTI)) is masked to the CRC depending on the owner or use of a PDCCH. If the PDCCH is a PDCCH for specific UE, an identifier unique to the UE, for example, a Cell-RNTI (C-RNTI) may be masked to the CRC. If the PDCCH is a PDCCH for a paging message, a paging indication identifier, for example, a Paging-RNTI (P-RNTI) may be masked to the CRC. If the PDCCH is a PDCCH for system information, more specifically, a System Information Block (SIB), a system information identifier, for example, a System Information-RNTI (SI-RNTI) may be masked to the CRC. A Random Access-RNTI (RA-RNTI) may be masked to the CRC in order to indicate a random access response which is a response to the transmission of a random access preamble by UE.

The enhanced PDCCH (EPDCCH) carries UE-specific signaling. The EPDCCH is located in a UE-specifically configured physical resource block (PRB). In other words, although the PDCCH may be transmitted in up to first three OFDM symbols in the first slot in the subframe as set forth above, the EPDCCH may be transmitted in a resource region other than the PDCCH. The point (i.e., symbol) where the EPDCCH starts in the subframe may be configured in the UE via higher layer signaling (e.g., RRC signaling).

The EPDCCH may carry the transmission format related to DL-SCH, resource allocation and HARQ information, transmission format related to UL-SCH, resource allocation and HARQ information, and resource allocation information related to sidelink shared channel (SL-SCH) and physical sidelink control channel (PSCCH). Multiple EPDCCHs may be supported. The UE may monitor the EPCCH's set.

The EPDCCH may be transmitted by way of one or more consecutive enhanced CCEs (ECCEs), and the number of ECCEs per EPDCCH may be determined depending on each EPDCCH format.

Each ECCE may consist of a plurality of enhanced resource element groups (EREGs). The EREG is used to define mapping of ECCE to RE. There are 16 EREGs per PRB pair. Apart from the RE carrying the DMRS in each PRB pair, all the REs are numbered from 0 to 15 in ascending order of frequency and then in ascending order of time.

The UE may monitor the plurality of EPDCCHs. For example, one or two EPDCCH sets may be configured in one PRB pair in which the UE monitors EPDCCH transmission.

Different coding rates for EPCCH may be realized by merging different numbers of ECCEs. The EPCCH may use localized transmission or distributed transmission and, thus, mapping of ECCE to RE in PRB may be varied.

Figure 4:
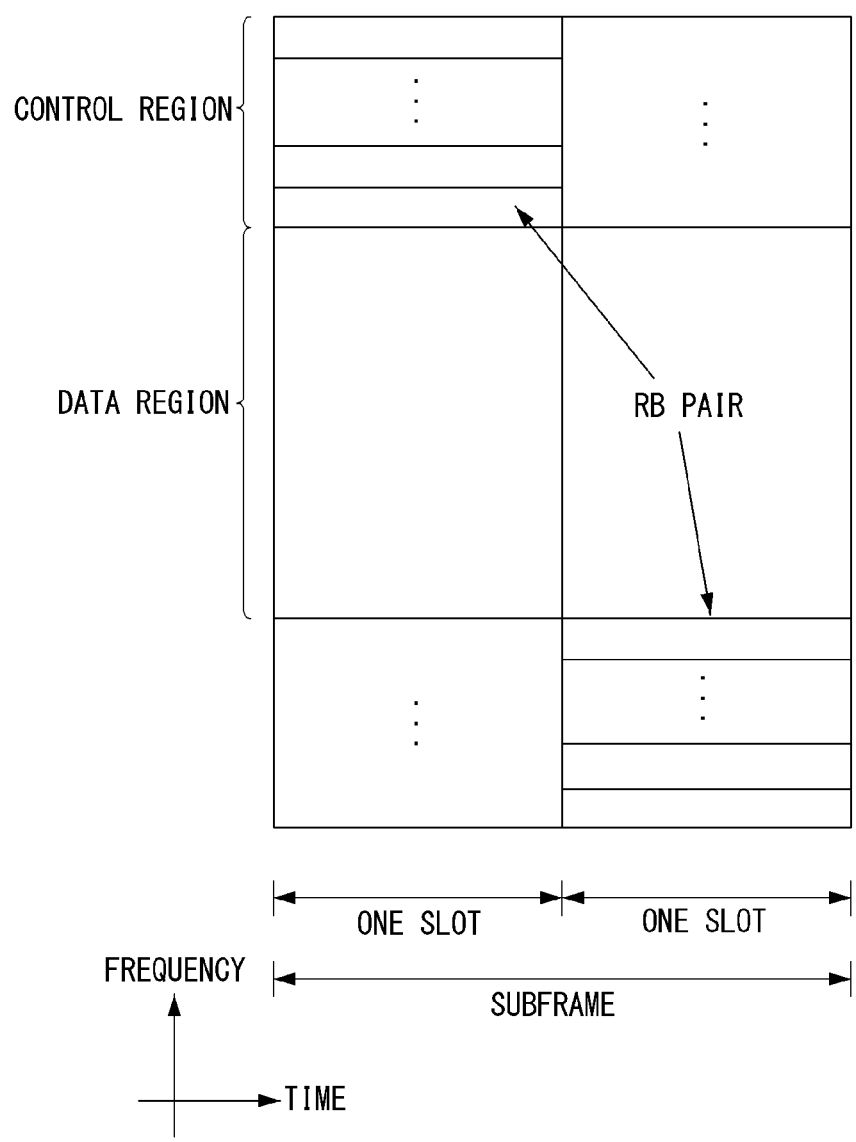
FIG. 4 illustrates a structure of an uplink subframe in a wireless communication system to which the disclosure may apply.

FIG. 4 shows the structure of an uplink subframe in a wireless communication system to which an embodiment of the disclosure may be applied.

Referring to FIG. 4, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region. In order to maintain single carrier characteristic, one UE does not send a PUCCH and a PUSCH at the same time.

A Resource Block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

NB-IoT (Narrowband-Internet of Things)

NB-IoT may mean a system for supporting low complexity and low power consumption with a system bandwidth (BW) corresponding to one physical resource block (1PRB) of a wireless communication system (e.g., an LTE system or NR system).

Here, NB-IoT may also be termed NB-LTE, NB-IOT enhancement, enhanced NB-IoT, further enhanced NB-IoT, or NB-NR. That is, NB-IoT may be replaced with other term defined, or to be defined, in the 3GPP standard. Hereinafter, for ease of description, such terms are collectively referred to as 'NB-IoT.'

NB-IoT may be used primarily in communication schemes to implement IoT (i.e., things of internet) by allowing cellular systems to support such devices (or UEs) as machine-type communication (MTC) devices. At this time, 1PRB of the existing system band is allocated for NB-IoT, thereby enabling efficient use of frequency. Further, since each UE recognizes a single PRB as each carrier in NB-IoT, PRB and carrier as mentioned herein may be interpreted as meaning the same.

Although the frame structure, physical channel, multi-carrier operation, operation mode, or regular signal transmission/reception related to NB-IoT are described below considering those of the legacy LTE system, they may also be applicable to next-generation systems (e.g., NR systems). Further, the content related to NB-IoT in the disclosure may be expanded and applied to machine type communication (MTC) which is oriented to similar technical goals (e.g., low power, low cost, and enhanced coverage).

1) Frame Structure and Physical Resource of NB-IoT

Figure 5:
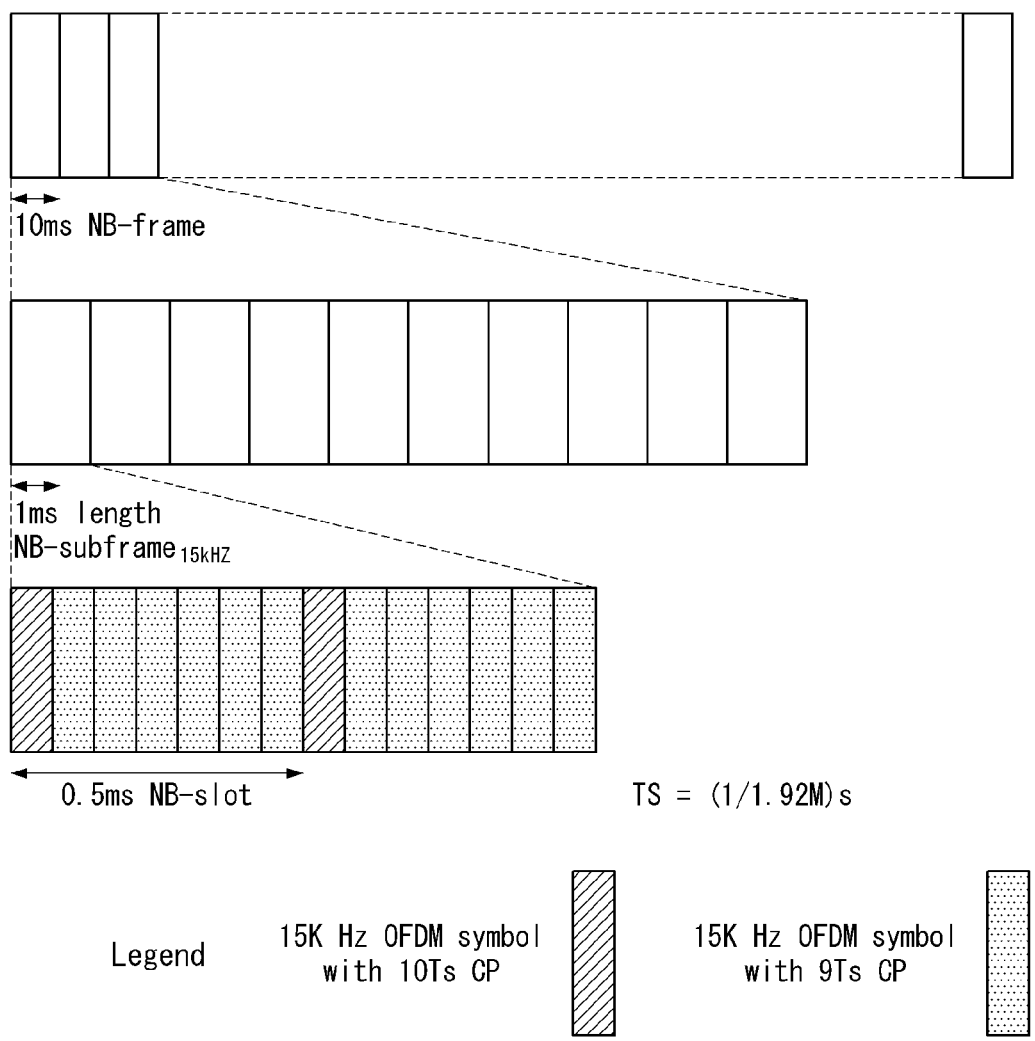
FIG. 5 is a view illustrating an NB-IoT frame structure in which a subcarrier spacing is 15 KHz, to which the disclosure may apply.
Figure 6:
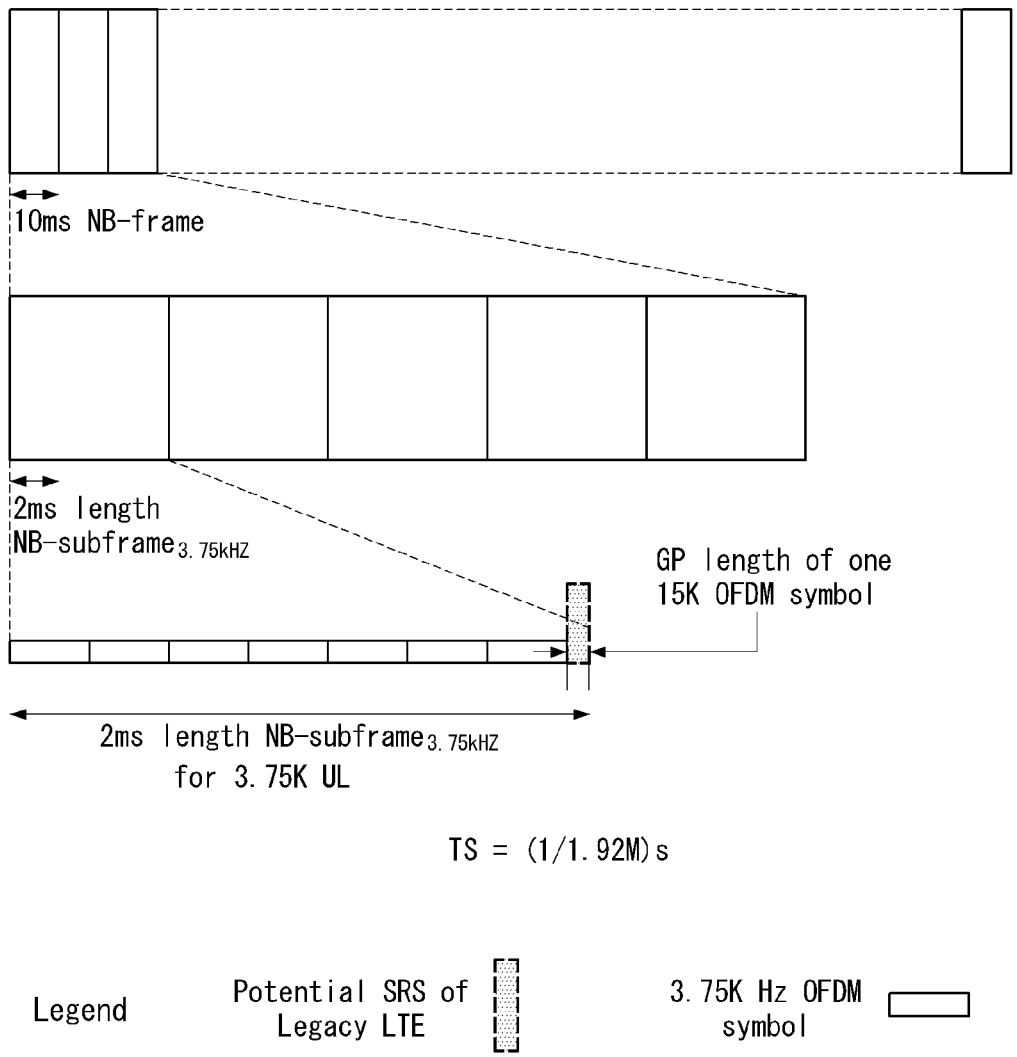
FIG. 6 is a view illustrating an NB-IoT frame structure in which a subcarrier spacing is 3.75 KHz, to which the disclosure may apply.

First, the NB-IoT frame structure may be configured differently depending on subcarrier spacings. Specifically, FIG. 5 illustrates an example frame structure when the subcarrier spacing is 15 kHz. FIG. 6 illustrates an example frame structure when the subcarrier spacing is 3.75 kHz. However, the NB-IoT frame structure is not limited thereto, and the NB-IoT for other subcarrier spacing (e.g., 30 kHz) may also be considered, with the time/frequency varied.

Further, although the LTE system frame structure-based NB-IoT frame structure is described herein as an example, this is merely an example, and schemes described herein may also be expanded and applied to NB-IoT based on next-generation system (e.g., NR) frame structure.

Referring to FIG. 5, the NB-IoT frame structure for a subcarrier spacing of 15 kHz may be configured to be the same as the frame structure of legacy systems (e.g., the LTE system). That is, a 10 ms NB-IoT frame includes 10 1 ms NB-IoT subframes, and a 1 ms NB-IoT subframe may include two 0.5 ms NB-IoT slots. Further, each 0.5 ms NB-IoT may include seven OFDM symbols.

In contrast, referring to FIG. 6, a 10 ms NB-IoT frame may include five 2 ms NB-IoT subframes, and a 2 ms NB-IoT subframe may include seven OFDM symbols and one guard period (GP). Further, the 2 ms NB-IoT subframe may also be represented as an NB-IoT slot or NB-IoT resource unit (RU).

Next, NB-IoT physical resources for the downlink and uplink are described.

First, NB-IoT downlink physical resources may be configured by referring to the physical resources of other wireless communication systems (e.g., the LTE system or NR system) except that the system bandwidth is a specific number of RBs (e.g., one RB, i.e., 180 kHz). As an example, where the NB-IoT downlink supports only 15 kHz subcarrier spacing as described above, the physical resources of NB-IoT downlink may be configured with the resource region, with the resource grid of the LTE system shown above in FIG. Cl limited to one RB (i.e., 1 PRB) in the frequency domain.

Figure 7:
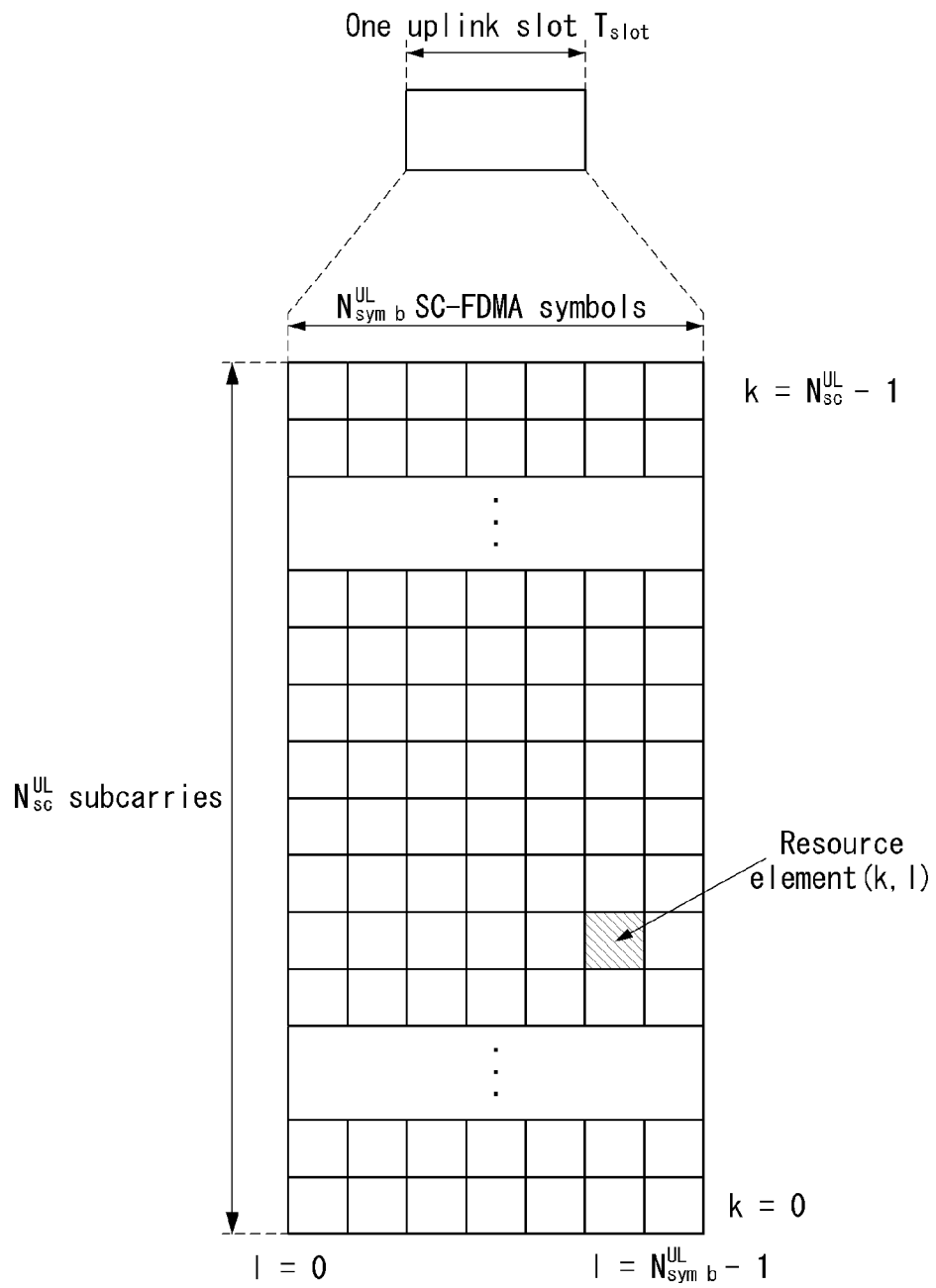
FIG. 7 is a view illustrating a resource grid for an NB-IoT uplink to which the disclosure may apply.

Next, the physical resources of NB-IoT uplink may also be configured with the system bandwidth limited to one RB, as is the downlink. As an example, where the NB-IoT uplink supports subcarrier spacings of 15 kHz and 3.75 kHz as described above, the resource grind for NB-IoT uplink may be represented as follows. At this time, the uplink band subcarrier count $N_{sc}^{UL}$ and slot period $T_{slot}$ in FIG. 7 may be given as shown in Table 3 below.

TABLE 3

| Subcarrier spacing | $N_{sc}^{UL}$ | $T_{slot}$ |
|---|---|---|
| Δf = 3.75 kHz | 48 | 61440 · $T_s$ |
| Δf = 15 kHz | 12 | 15360 · $T_s$ |

Further, the resource unit (RU) of NB-IoT uplink may be constituted with SC-FDMA symbols in the time domain and with $N_{symb}^{UL} N_{slots}^{UL}$ consecutive subcarriers in the frequency domain. As an example, $N_{sc}^{RU}$ and $N_{symb}^{UL}$ may be given as in Table 4 below in the case of frame structure type 1 (i.e., FDD) and as in Table 5 in the case of frame structure type 2 (i.e., TDD).

TABLE 4

| NPUSCH format | Δf | $N_{sc}^{RU}$ | $N_{slots}^{UL}$ | $N_{symb}^{UL}$ |
|---|---|---|---|---|
| 1 | 3.75 kHz | 1 | 16 | 7 |
|   | 15 kHz | 1 | 16 |   |
|   |        | 3 | 8  |   |
|   |        | 6 | 4  |   |
|   |        | 12| 2  |   |
| 2 | 3.75 kHz | 1 | 4 |   |
|   | 15 kHz | 1 | 4 |   |

TABLE 5

| NPUSCH format | Δf | Supported uplink-fdownlink configurations | $N_{sc}^{RU}$ | $N_{slots}^{UL}$ | $N_{symb}^{UL}$ |
|---|---|---|---|---|---|
| 1 | 3.75 kHz | 1, 4 | 1 | 16 | 7 |
|   | 15 kHz | 1, 2, 3, 4, 5 | 1 | 16 |   |
|   |        |               | 3 | 8  |   |
|   |        |               | 6 | 4  |   |
|   |        |               | 12| 2  |   |
| 2 | 3.75 kHz | 1, 4 | 1 | 4 |   |
|   | 15 kHz | 1, 2, 3, 4, 5 | 1 | 4 |   |

2) NB-IoT Physical Channel

The base station and/or UE supporting NB-IoT may be configured to transmit/receive physical channels and/or physical signals configured separately from legacy systems. Hereinafter, physical channels and/or physical signals supported by NB-IoT are described below in detail.

First, the downlink of NB-IoT system is described. The OFDMA (Orthogonal Frequency Division Multiple Access) scheme may be applied to the NB-IoT disposed on based on the 15 kHz subcarrier spacing. Through this, inter-subcarrier orthogonality may be provided so that co-existence with legacy systems (e.g., the LTE system or NR system) may be efficiently supported.

The physical channel of the NB-IoT system may be represented in the form of adding 'N (Narrowband)' to be differentiated from legacy systems. For example, downlink physical channels are defined as, e.g., NPBCH (Narrowband Physical Broadcast Channel), NPDCCH(Narrowband Physical Downlink Control Channel), and NPDSCH (Narrowband Physical Downlink Shared Channel), and downlink physical signals may be defined as, e.g., NPSS (Narrowband Primary Synchronization Signal), NSSS (Narrowband Secondary Synchronization Signal), NRS(Narrowband Reference Signal), NPRS(Narrowband Positioning Reference Signal), and NWUS (Narrowband Wake Up Signal).

Generally, the above-described NB-IoT disposed on physical channels and physical signals may be configured to be transmitted based on a time domain multiplexing scheme and/or frequency domain multiplexing scheme.

Further, specifically, for NB-IoT system downlink channels, NPBCH, NPDCCH, and NPDSCH, repetition transmission may be performed for coverage enhancement.

Further, NB-IoT uses a newly defined DCI format. As an example, DCI formats defined for NB-IoT may be defined as, e.g., DCI format N0, DCI format N1, and DCI format N2.

Next, NB-IoT system uplink is described. The SC-FDMA (Single Carrier Frequency Division Multiple Access) scheme may be applied to the NB-IoT uplink based on the subcarrier spacing of 15 kHz or 3.75 kHz. Multi-tone transmission and single-tone transmission may be supported for the NB-IoT uplink. As an example, multi-tone transmission is supported only in the 15 kHz subcarrier spacing, and single-tone transmission may be supported for the 15 kHz and 3.75 kHz subcarrier spacings.

As mentioned above in connection with downlink, the physical channel of the NB-IoT system may be represented in the form of adding 'N (Narrowband)' to be differentiated from legacy systems. For example, uplink physical channels may be defined as NPRACH (Narrowband Physical Random Access Channel) and NPUSCH (Narrowband Physical Uplink Shared Channel), and uplink physical signals may be defined as, e.g., NDMRS (Narrowband Demodulation Reference Signal).

Here, NPUSCH may be configured as NPUSCH format 1 or NPUSCH format 2. As an example, NPUSCH format 1 may be used for UL-SCH transmission (or transport), and NPUSCH format 2 may be used for uplink control information transmission, such as HARQ ACK signaling.

Further, specifically, for the NB-IoT system downlink channels, NPRACH, repetition transmission may be performed for coverage enhancement. In this case, repetition transmission may be performed, with frequency hopping applied.

3) NB-IoT Multi-Carrier Operation

Next, NB-IoT multi-carrier operation is described. Multi-carrier operation may mean that multiple carriers configured to have different uses (i.e., different types) when the base station and/or UE transmits/receives channels and/or signals in NB-IoT are used.

Generally, NB-IoT may be operated in the above-described multi-carrier mode. At this time, NB-IoT carrier may be defined as anchor-type carrier (i.e., anchor carrier, anchor PRB) and non-anchor type carrier (i.e., non-anchor carrier, non-anchor PRB).

Anchor carrier may mean a carrier to transmit NPSS, NSSS, NPBCH, and NPDSCH for system block information (N-SIB) for initial access purposes in view of the base station. That is, the NB-IoT carrier for initial access is denoted an anchor carrier, and the other(s) may be denoted non-anchor carrier. At this time, only one or multiple anchor carriers may be present on the system.

4) NB-IoT Operation Mode

Next, NB-IoT operation mode is described. Three operation modes may be supported in the NB-IoT system. FIG. 8 shows example of operation modes supported in the NB-IoT system. Although NB-IoT operation modes are described herein based on LTE bands, this is solely for ease of description, and the NB-IoT operation modes may also be expanded and applied to the bands of other systems (e.g., NR system bands).

Specifically, FIG. 8(a) illustrates an example in-band system, FIG. 8(b) illustrates an example guard-band system, and FIG. 8(c) illustrates an example stand-alone system. At this time, in-band system, guard-band system, and stand-alone system, respectively, may be represented as in-band mode, guard-band mode, and stand-alone mode.

In-band system may mean a system or mode that uses specific 1RB (i.e., PRB) in the (legacy) LTE band for NB-IoT. The in-band system may be operated, with some resource blocks of the LTE system carrier allocated.

Guard-band system may mean a system or mode that uses, for NB-IoT, a reserved space for the guard-band of the (legacy) LTE band. The guard-band system may be operated, with the guard-band of LTE carrier not used as a resource block in the LTE system allocated. As an example, the (legacy) LTE band may be configured to have a guard band of, at least, 100 kHz at the end of each LTE band. To use 200 kHz, two non-contiguous guard bands may be used.

As described above, the in-band system and the guard-band system may be operated in the structure where NB-IoT coexists in the (legacy) LTE band.

In contrast, the standalone system may mean a system or mode configured independently from the (legacy) LTE band. The standalone system may be operated, with a frequency band (e.g., a GSM carrier reassigned in the future) used in the GERAN (GSM EDGE Radio Access Network) separately allocated.

The above-described three operation modes each may be operated independently or two or more operation modes may be operated in combination.

5) General Signal Transmission/Reception Procedure of NB-IoT

Figure 9:
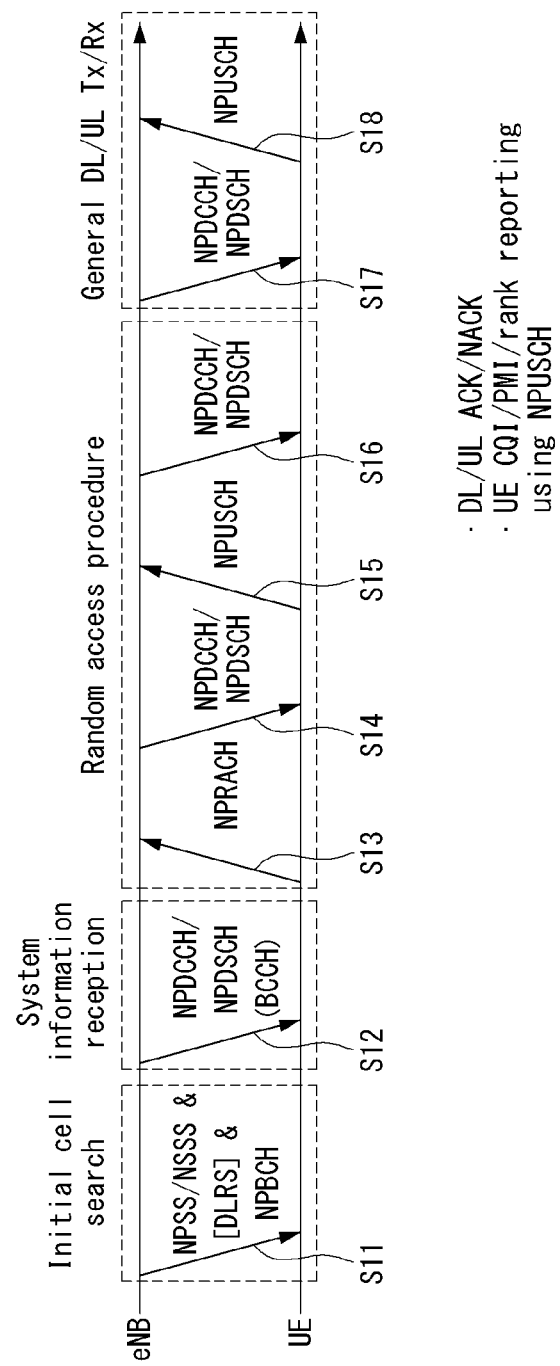
FIG. 9 is a view illustrating signal transmission/reception between a base station and UE of an NB-IoT to which the disclosure may apply.

FIG. 9 is a view illustrating physical channels and an example general signal transmission method available to NB-IoT. In the wireless communication system, the NB-IoT UE may receive information via downlink (DL) from the base station, and the NB-IoT UE may transmit information to the base station via uplink (UL). In other words, in the wireless communication system, the base station may transmit information to the NB-IoT UE via downlink, and the base station may receive information from the NB-IoT UE via uplink.

The information communicated between the base station and the NB-IoT UE may include data and various pieces of control information, and there may be various physical channels depending on the kind/usage of information transmitted/received therebetween.

The NB-IoT UE, which powers back on or enters a new cell, may perform an initial cell search task, such as synchronization (S11). To that end, the NB-IoT UE may receive the NPSS and NSSS from the base station, perform synchronization with the base station, and obtain such information as, e.g., cell identity (ID). Further, the NB-IoT UE may receive the NPBCH from the base station and obtain in-cell broadcast information. Further, in the initial cell discovery step, the NB-IoT UE may receive a DL RS (Downlink Reference Signal) and identify the downlink channel state.

In other words, where there is an NB-IoT UE newly entering the cell, the base station may perform an initial cell discovery task, such as syncing with the UE. The base station may transmit the NPSS and NSSS to the NB-IoT UE, performing synchronization with the UE, and transfer such information as, e.g., cell identity (ID). Further, the base station may transmit (or broadcast) the NPBCH to the NB-IoT UE, transferring in-cell broadcast information. Further, the base station may transmit a DL RS to the NB-IoT UE in the initial cell discovery step, identifying the downlink channel state.

After finishing the initial cell discovery, the NB-IoT UE may obtain more specific system information by receiving the NPDCCH and its corresponding NPDSCH (S12). In other words, the base station may transfer more specific system information by transmitting the NPDCCH and its corresponding NPDSCH to the NB-IoT UE that has finished the initial cell discovery.

Thereafter, the NB-IoT UE may perform a random access procedure for completing the attachment to the base station (S13 or S16).

Specifically, the NB-IoT UE may transmit a preamble to the base station via the NPRACH (S13). As described above, the NPRACH may be configured to be repeatedly transmitted based on, e.g., frequency hopping for, e.g., coverage enhancement. In other words, the base station may (repeatedly) receive the preamble via the NPRACH from the NB-IoT UE.

Thereafter, the NB-IoT UE may receive an RAR (Random Access Response) for the preamble from the base station via the NPDCCH and its corresponding NPDSCH (S14). In other words, the base station may transmit the RAR (Random Access Response) for the preamble to the NB-IoT UE via the NPDCCH and its corresponding NPDSCH.

Thereafter, the NB-IoT UE may transmit the NPUSCH to the base station using the scheduling information in the RAR (S15) and perform a contention resolution procedure, like the NPDCCH and its corresponding NPDSCH (S16). In other words, the base station may receive the NPUSCH from the UE using the scheduling information in the NB-IoT RAR and perform the contention resolution procedure.

The NB-IoT UE having performed the above-described procedure may perform NPDCCH/NPDSCH reception (S17) and NPUSCH transmission (S18) as a regular uplink/downlink signal transmission procedure. In other words, after performing the above-described procedures, the base station may perform NPDCCH/NPDSCH transmission and NPUSCH reception as a regular signal transmission/reception procedure for the NB-IoT UE.

In the case of NB-IoT, as mentioned above, the NPBCH, NPDCCH, and NPDSCH may be repeatedly transmitted for, e.g., coverage enhancement. Further, in the case of NB-IoT, the UL-SCH (i.e., regular uplink data) and uplink control information may be transferred via the NPUSCH. At this time, the UL-SCH and uplink control information may be configured to be transmitted via different NPUSCH formats (e.g., NPUSCH format 1, NPPUSCH format 2).

Further, the control information transmitted by the UE to the base station may be denoted UCI (Uplink Control Information). The UCI may include, e.g., HARQ ACK/NACK(Hybrid Automatic Repeat and reQuest Acknowledgement/Negative-ACK), SR(Scheduling Request), and CSI (Channel State Information). The CSI includes, e.g., CQI (Channel Quality Indicator) and PMI (Precoding Matrix Indicator), RI (Rank Indication). As described above, in NB-IoT, the UCI may be transmitted typically via the NPUSCH. Further, at the request/indication from the network (e.g., the base station), the UE may transmit the UCI via the NPUSCH periodically, aperiodically, or semi-persistently.

Narrowband (NB)-LTE is a system for supporting low complexity and low power consumption, with a system bandwidth (BW) corresponding to 1PRB (physical resource block) of the LTE system.

The NB-LTE system may be used as a communication scheme to support devices, such as primarily machine-type communication (MTC), in the cellular system to thereby implement internet-of-things (IoT).

This provides the advantages that OFDM parameters, e.g., the subcarrier spacing of legacy LTE, identical to those of LTE may be used and 1PRB may be allocated for NB-LTE in the legacy LTE band to enable efficient use of frequency without additional band allocations.

Hereinafter, in the case of downlink, NB-LTE physical channels are defined as NPSS/NSSS, NPBCH, NPDCCH/NEPDCCH, and NPDSCH, and N is added to distinguish from LTE.

Further, as used herein, the phrase "monitors search space" means the process of decoding as much NPDCCH as a specific area according to the DCI format that is intended to be received via the search space and then scrambling the CRC (cyclic redundancy check) to a pre-agreed specific RNTI (Radio Network Temporary Identifier) to thereby identify whether it is the desired value.

Additionally, since in the NB-LTE system, each UE recognizes single PRB as each carrier, PRB as mentioned herein may mean the same thing as carrier.

Meanwhile, DCI format N0, N1, and N2 disclosed herein mean DCI format N0, N1, and N2 specified in the 3GPP TS 36.212[2] standard.

It is also considered to adopt frame structure type 2 (i.e., TDD) in Rel. 15 NB-IoT.

That is, it is being considered to transmit uplink/downlink (UL/DL) in time division duplex via a single PRB.

Further, in in-band mode and guard-band mode, at least one or more configurations among several uplink downlink configurations of Table 1 are used.

Meanwhile, in U/D configuration #2 or #5 where there is only one contiguous uplink (UL) subframe, UL transmission using 3.75 kHz subcarrier spacing may be impossible.

This is why the default slot duration of 3.75 kHz single tone transmission is 2 ms.

Thus, in the NB-IoT TDD system that supports the U/D configuration not supporting the 3.75 kHz subcarrier spacing, the DCI design in the legacy FDD system may be varied.

Thus proposed is a detailed DCI design in the NB-IoT TDD system supporting the U/D configuration not supporting the 3.75 kHz subcarrier spacing according to the disclosure.

MSG3 Grant and DCI Format N0 Design Detail for Different U/D Configurations

In the NB-IoT FDD system, MSG3 grant and DCI format N0 are defined as in Tables 6 and 7 below.

TABLE 6

| DCI format N0 | Bits |
| --- | --- |
| Flag for format N0/format N1 differentiation | 1 |
| Subcarrier indication | 6 |
| Resource assignment | 3 |
| Scheduling delay | 2 |
| Modulation and coding scheme | 4 |
| Redundancy version | 1 |
| Repetition number | 3 |
| New data indicator | 1 |
| DCI subframe repetition number | 2 |
| HARQ process number | 1 |
| SUM | 24 |

TABLE 7

| Narrowband MSG3 grant (in NPDSCH) | Bits |
| --- | --- |
| Uplink subcarrier spacing is '0' = 3.75 kHz or '1' = 15 kHz | 1 |
| Subcarrier indication | 6 |
| Scheduling delay (k_0 = 12 for I_Delay = 0) | 2 |
| MSG3 Repetition number | 3 |
| MCS index indicating TBS, modulation, and number of RUs for Msg3 | 3 |
| SUM | 15 |

TABLE 8

| Subcarrier indication field ($I_{sc}$) | Set of Allocated subcarriers ($n_{sc}$) |
| --- | --- |
| 0-11 | $I_{sc}$ |
| 12-15 | $3(I_{sc} - 12) + \{0, 1, 2\}$ |
| 16-17 | $6(I_{sc} - 16) + \{0, 1, 2, 3, 4, 5\}$ |
| 18 | $\{0, 1, 2, 3, 4, 5, 6, 7, 8, 9, 10, 11\}$ |
| 19-63 | Reserved |

In the TDD NB-IoT system, in the U/D configuration not supporting 3.75 kHz subcarrier spacing UL transmission, the subcarrier indication field in Table 6 and Uplink subcarrier spacing is '0'=3.75 kHz or '1'=15 kHz field and Subcarrier indication field in Table 7 need to be modified.

That is, referring to Table 8, in the corresponding case, the subcarrier indication field of Tables 6 and 7 may be operated only with 6 bits less one bit, i.e., 5 bits.

Further, the uplink subcarrier spacing field of Table 7 may be operated even with 1 bit less 1 bit, i.e., no bit.

Thus, specific methods of differently configuring the DCI field depending on U/D configurations meeting a specific condition may be summed up as follows.

In the following methods, 'unnecessary field' may be set as k bits.

For example, k may be subcarrier indication field 1 bit in DCI format N0 and, in the narrowband MSG3 grant, k may be 2 bits, the sum of the subcarrier indication field 1 bit and uplink subcarrier spacing field 1 bit.

(Method 1)

Method 1 is a method of configuring the unnecessary field as a reserved field.

This method has the advantage that it may be applied without a significant change in the specifications.

However, it has the disadvantage that unless the base station changes to the U/D configuration supporting the 3.75 kHz UL transmission, the unnecessary field should be transmitted all the time.

(Method 2)

Method 2 is a method of transmission, with the unnecessary field filled with 0s.

Method 2 is similar to method 1 in that the unnecessary field is not deleted out but may be configured to play a role as a virtual CRC as transmission is performed, with the field filled always with 0s.

However, method 2 has the disadvantage that unless the base station changes to the U/D configuration supporting the 3.75 kHz UL transmission, the field should be transmitted all the time.

However, as compared with method 1, method 2 has some advantage because it is not the case that the field is never used.

(Method 3)

Method 3 is a method of creating additional states for subcarrier indication to use the unnecessary field.

That is, a new table may be created, applied, and used by adding T states to the 19 states of Table 8.

In other words, in the U/D configuration supporting 3.75 kHz subcarrier spacing UL transmission, it is configured to interpret the subcarrier indication field value using Table 8 and, in the U/D configuration not supporting 3.75 kHz subcarrier spacing UL transmission, it may be configured to interpret the subcarrier indication field value using a new table, not Table 8.

At this time, where T, the number of the states added to Table 8, is 19, Table 9 may be an example of the new table.

Method 3 has the merit that fully dynamic resource allocation is possible for UL transmission using 15 kHz subcarrier spacing, but the demerit that all of the states cannot be used upon multiplexing with the NPRACH supporting 3.75 kHz subcarrier spacing.

Further, it is preferable that T is 14 or more for the total number of the states in the subcarrier indication field using 6 bits to be 33 or more.

TABLE 9

| Subcarrier indication field ($I_{sc}$) | Set of Allocated subcarriers ($n_{sc}$) |
|---|---|
| 0-11 | $I_{sc}$ |
| 12-21 | ($I_{sc}$ − 12) + {0, 1, 2} |
| 22-30 | ($I_{sc}$ − 22) + {0, 1, 2, 3} |
| 31-37 | ($I_{sc}$ − 31) + {0, 1, 2, 3, 4, 5} |
| 38 | {0, 1, 2, 3, 4, 5, 6, 7, 8, 9, 10, 11} |
| 39-63 | Reserved |

(Method 4)

Method 4 is a method of deleting out the unnecessary field.

That is, DCI format N0 may be configured to reduce the subcarrier indication field from 6 bits to 5 bits.

Further, in the MSG3 grant, the subcarrier indication field may be reduced from 6 bits to 5 bits and it may be configured to delete out uplink subcarrier spacing field 1 bit.

Method 4 is most advantageous in that it has no unnecessary resource waste.

In methods 1 to 4, as in the existing specifications, from the UE's standpoint, for blind detection of DCI format N0 and DCI format N1, zero padding needs to be performed on the one with smaller payload size of the two formats to allow the two formats to have the same payload size.

Further, among the above-described methods, different methods may be applied to DCI format N0 and MSG3 grant.

Further, the methods may be combined and applied.

UL Subcarrier Spacing Indication in SIB by N Bits (N is a Positive Integer)

As described above, in the Rel. 15 NB-IoT TDD system, the base station may previously determine the UL subcarrier spacing supported in a specific UL/DL configuration.

At this time, the UE may receive UL subcarrier spacing information supported in the current NB-IoT cell for the SIB (which may be SIB1-NB specifically) where the tdd-Config-NB parameter is to be transmitted using N bits.

For example, since there may be a total of three cases, (1) the base station supports only 3.75 kHz subcarrier spacing, (2) supports only 15 kHz subcarrier spacing, and (3) supports both 3.75 kHz subcarrier spacing and 15 kHz subcarrier spacing, it may be configured that one of the three cases is determined using 2 bits (N=2) and transferred.

At this time, the reason why such selection is possible as to support only a specific UL subcarrier spacing (specifically 15 kHz subcarrier spacing) depending on the UL/DL configuration used by a specific cell is that one slot duration of the 3.75 kHz subcarrier spacing is 2 ms.

That is, such an occasion may exist where the base station selects a specific UL/DL configuration and it is not easy to secure two contiguous UL subframes considering various contexts (e.g., invalid UL subframe).

In this case, it may be preferable to configure not to use the 3.75 kHz subcarrier spacing.

Further, where the base station intends to support only 15 kHz subcarrier spacing for ease of scheduling although both the 3.75 kHz subcarrier spacing and 15 kHz subcarrier spacing are supportable, it may be configured not to use the 3.75 kHz subcarrier spacing.

For example, where there are continuous odd-numbered UL subframes larger than 2, the base station may configure to use only 15 kHz UL subcarrier spacing for ease of resource allocation or scheduling delay.

Further, even when the base station determines to supports only the 3.75 kHz subcarrier spacing although the 3.75 kHz subcarrier spacing and 15 kHz subcarrier spacing both are supportable, it may be configured not to use the 15 kHz subcarrier spacing.

Such base station's determination (i.e., using a specific UL subcarrier spacing only) is transferred to the UE via the SIB.

The UE performs decoding/monitoring with the belief that the MSG3 grant size and DCI format N0 size are modified and transmitted from the base station according to such determination.

At this time, where a specific UL subcarrier spacing only is used, it may be summarized how the MSG3 grant size and DCI format N0 size may be varied, as follows.

(1) Where 3.75 kHz Subcarrier Spacing Only is Supported

Where the TDD NB-IoT system does not support 15 kHz subcarrier spacing UL transmission, the uplink subcarrier spacing field needs to be modified.

That is, the uplink subcarrier spacing field of Table 7 may be operated even with 1 bit less 1 bit, i.e., no bit.

Resultantly, the methods proposed in the above-described MSG3 Grant and DCI format N0 design detail for different U/D configurations may be applied here as well.

The 'unnecessary field' denoted in the above methods may be set to k bit(s).

At this time, in narrowband MSG3 grant, k may be Uplink subcarrier spacing field 1 bit.

(2) Where 15 kHz Subcarrier Spacing Only is Supported

Where the TDD NB-IoT system does not support 3.75 kHz subcarrier spacing UL transmission, the field of Tables 9 and 10 needs to be modified as mentioned in MSG3 Grant and DCI format N0 design detail for different U/D configurations.

That is, referring to Table 8, in the corresponding case, the subcarrier indication field of Tables 9 and 10 may be operated only with 6 bits less one bit, i.e., 5 bits.

And, the uplink subcarrier spacing field of Table 7 may be operated even with 1 bit less 1 bit, i.e., no bit.

Resultantly, the methods proposed in the above-described MSG3 Grant and DCI format N0 design detail for different U/D configurations may be applied here as well.

In the methods, 'unnecessary field' may be set as k bits.

Further, k may be subcarrier indication field 1 bit in DCI format N0 and, in the narrowband MSG3 grant, k may be 2 bits, the sum of the subcarrier indication field 1 bit and uplink subcarrier spacing field 1 bit.

(3) Where 3.75 kHz Subcarrier Spacing and 15 kHz Subcarrier Spacing Both are Supported Where the TDD NB-IoT system supports both 3.75 kHz subcarrier spacing and 15 kHz subcarrier spacing, it may be configured to use the same method applied to the FDD NB-IoT system.

That is, all are used without any change to Tables 6 and 7, and the UL subcarrier spacing of UL grant may be determined to use the same value as the subcarrier spacing received via the MSG3 grant.

DCI Format N0 Design Detail for Different U/D Configurations

Further to what has been described in MSG3 Grant and DCI format N0 design detail for different U/D configurations, Rel. 15 TDD NB-IoT may try to fetch a different number of UL multi-tones, as operated in the 15 kHz subcarrier spacing (SCS) according to a specific U/D configuration number, from that used in FDD That is, legacy FDD supports multi-tone transmission configured of 3 tones, 6 tones, and 12 tones, as well as single tone transmission.

However, Rel. 15 TDD NB-IoT intends to support multi-tone transmission configured of 4 tones and 12 tones and single tone transmission in a specific U/D configuration (specifically, U/D configuration 3 or 6, i.e., the cases where three or more consecutive UL SFs are secured).

As such, methods of configuring how many tones a multi-tone is configured with according to a specific U/D configuration may be summed up as follows.

(Method 1)

Method 1 refers to a method that defines all transmissions (i.e., single tone and/or multi-tone) supportable in TDD in the specifications and configures them to be explicitly configurable via SIB.

Since UL subcarrier spacing information supported in the current NB-IoT cell may be transferred via N bits in the SIB (specifically SIB1-NB) where tdd-Config-NB parameter is to be transmitted in the above-described UL subcarrier spacing indication in SIB by N bits (N is a positive integer), it may be configured that the transfer is possible, tied up with the information.

Specifically, this may be represented as in the following five scenario cases.

where 3.75 kHz SCS only is supported, (2) where 15 kHz SCS alone is supported, and UL transmission configured of {single tone, 3-tones, 6-tones, 12-tones} is supported, (3) where only 15 kHz SCS is supported, and UL transmission configured of {single tone, 4-tones, 12-tones} is supported, (4) where both 3.75 kHz and 15 kHz SCS are supported, and UL transmission configured of {single tone, 3-tones, 6-tones, 12-tones} for 15 kHz SCS is supported, (5) where 3.75 kHz and 15 kHz SCS both are supported, and UL transmission configured of {single tone, 4-tones, 12-tones} for 15 kHz SCS is supported.

Thus, at this time, N may be 3 bits.

Further, this method features transferring information independently form UL/DL configuration.

(Method 2)

Method 2 refers to a method that defines all transmissions (i.e., single tone and/or multi-tone) supportable in TDD and configures them to be implicitly configurable via SIB.

In other words, this method is a method of pre-agreeing on what UL transmissions are to be used depending on configured UL/DL configuration values or configured SCS values.

Specific examples may be summarized as in Table 10 below.

Table 10 shows a UL transmission set for UL/DL configurations when 15 kHz subcarrier spacing is supported.

TABLE 10

| UL/DL configuration | UL transmission set |
|---|---|
| #1, #2, #4, #5 | Single tone, 3-tones, 6-tones, 12-tones |
| #3, #6 | Single tone, 4-tones, 12-tones |

It may be configured that the UE may be aware of the UL transmission set currently available in the cell based on the UL/DL configuration information transmitted via SIB and information for supported subcarrier spacing (SCS).

It may also be configured that as a specific field of DCI format N0 is modified when the NB-IoT system only supports 15 kHz SCS, but not 3.75 kHz SCS, so the subcarrier indication field of DCI format N0 may be modified and applied as shown in Table 11 even when 15 kHz SCS with single tone, 4-tones, 12-tones is supported.

TABLE 11

| Subcarrier indication field ($I_{sc}$) | Set of Allocated subcarriers ($n_{sc}$) |
|---|---|
| 0-11 | $I_{sc}$ |
| 12-14 | $4(I_{sc} - 12) + \{0, 1, 2, 3\}$ |
| 15 | $\{0, 1, 2, 3, 4, 5, 6, 7, 8, 9, 10, 11\}$ |

Table 11 represents that single tone, 4-tones, and 12-tones may be expressed with only 4 bits.

Thus, according to what has been described above, 'unnecessary field' k is 2 bits.

Also in this case, the various methods mentioned in the above-described MSG3 Grant and DCI format N0 design detail for different U/D configurations may be applied here as well.

In other words, the size of DCI format is variable depending on UL/DL configurations and, in each case, the size of the field may be determined depending on the number of states in the relevant table.

Further, the above-described method deals with the variability of the DCI format size depending on UL/DL configurations, and this may be further generalized so that the UL/DL configuration is repeated per specific period (e.g., Xms), and the DCI format size is variable depending on the minimum or maximum value (e.g., L ms) of the number of consecutive UL subframes in X ms.

For example, where 15 kHz SCS is used as default and L is 2 ms, the relevant field may be represented with 5 bits as in Table 12 (which results from reducing only reserved states in Table 8) and, where L is 3 ms, the relevant field may be represented using 4 bits as in Table 8.

In other words, it may be configured that where L is 2 ms, the UL transmission configured of {single tone, 3-tones, 6-tones, 12-tones} is supported and, where L is 3 ms, the UL transmission configured of {single tone, 4-tones, 12-tones} is supported.

TABLE 12

| Subcarrier indication field ($I_{sc}$) | Set of Allocated subcarriers ($n_{sc}$) |
|---|---|
| 0-11 | $I_{sc}$ |
| 12-15 | $3(I_{sc} - 12) + \{0, 1, 2\}$ |
| 16-17 | $6(I_{sc} - 16) + \{0, 1, 2, 3, 4, 5\}$ |
| 18 | $\{0, 1, 2, 3, 4, 5, 6, 7, 8, 9, 10, 11\}$ |
| 19-31 | Reserved |

It may also be configured that depending on special subframe configurations (and/or number of available UpPTS symbol), as well as UL/DL configurations, the DCI format size is variable.

Under the presumption that the NPUSCH may be transmitted in UpPTS symbols, if the number of UpPTS symbols available is U (e.g., U=7, 1 slot) or more, and the minimum or maximum value (L') of the existing consecutive UL subframe is 1, the relevant field may be represented with 5 bits as in Table 9.

Where the minimum or maximum value (L') of the existing consecutive UL subframe is 2, the relevant field may be represented with 4 bits as in Table 11.

In other words, it may be configured that where L' is 1, the UL transmission configured of {single tone, 3-tones, 6-tones, 12-tones} is supported and, where L' is 2, the UL transmission configured of {single tone, 4-tones, 12-tones} is supported.

Further, where the NPUSCH may be transmitted for a specific UpPTS symbol number (e.g., 7 symbols) or more, a specific part of the default RU may be punctured (or rate-matched).

For example, it may be configured that, for 3 ms RU (i.e., 4 tones transmission), transmission may commence at the start point of a special subframe, and a specific number of first UL symbols (e.g., 14-U symbols) may be subject to puncturing (or rate matching).

Similarly, it may be configured that the start point of the default RU (resource unit) is transmitted at the UpPTS starting symbol configured from the higher layer, and the other non-transmitted back portion may be punctured (or rate-matched).

The Different Carriers Between MSG1 and MSG3

TDD NPRACH discussed in Rel. 15 is briefly described below.

Although identical to FDD in that N symbols using 3.75 kHz subcarrier spacing and one CP form one symbol group, TDD is configured to transmit, back-to-back, G symbol groups in consecutive UL SFs.

A single preamble is constituted of P symbol groups.

As described above, since in TDD NB-IoT, the NPRACH preamble format design is defined to be different from that in FDD NB-IoT, use of the NPRACH resource configurations used in legacy FDD may cause the following issues.

Figure 10:
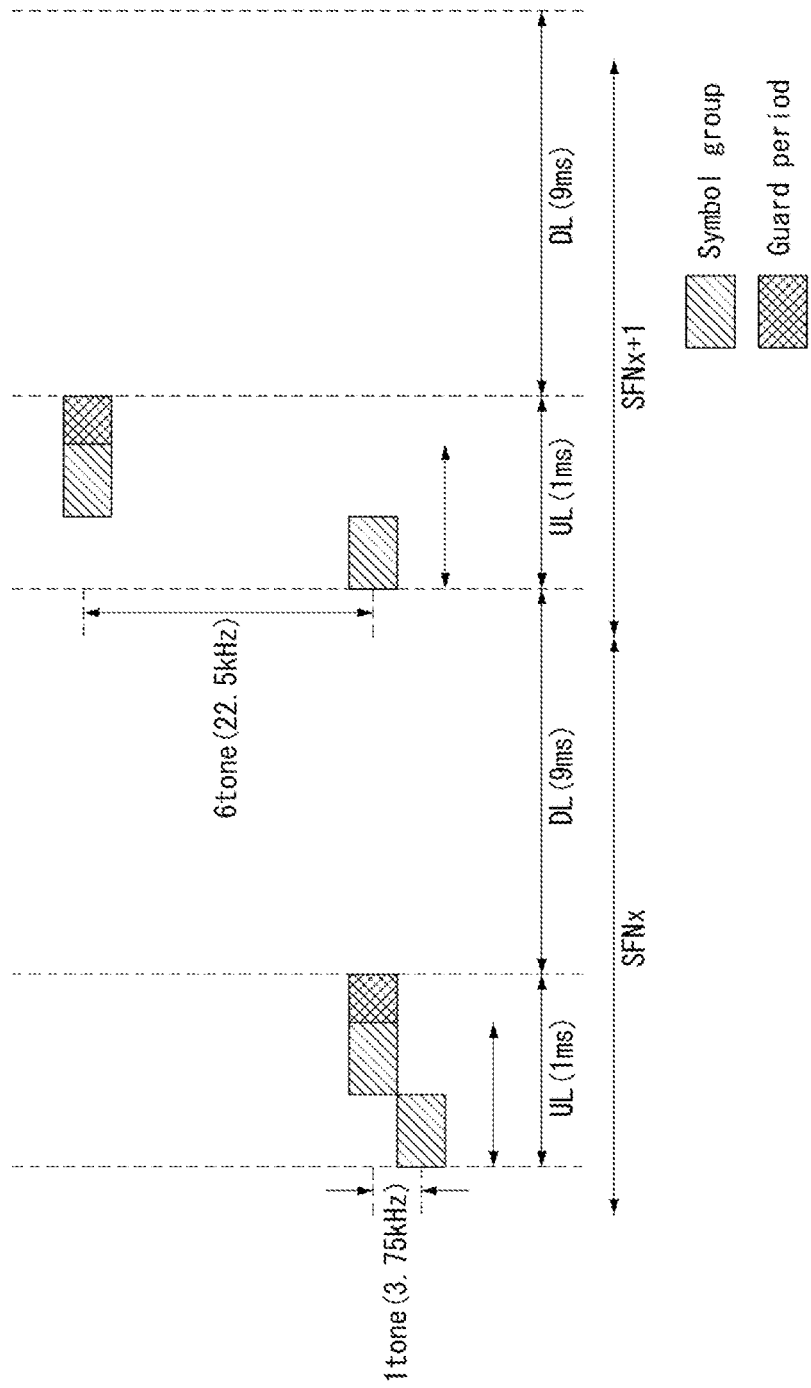
FIG. 10 is a view illustrating an example of transmission of a TDD NPRACH preamble.

For example, to transmit such preamble as G=2 or G=4 in UL/DL configuration #5(1UL in 10 ms) as shown in FIG. 10, a total of 20 ms (2 Radio frames) are needed.

That is, only 1SF in the single radio frame in UL/DL configuration #5 is UL SF, and thus, 20 ms in total is necessary as shown in FIG. 10.

If the repetition number of the relevant preamble is configured with 64, 20×64=1280 ms is required to transmit the whole preamble.

Thus, the base station needs to set the period of the NPRACH resource to be, at least, 1280 ms or more.

If the base station sets the period of the NPRACH resource to 1280 ms, the resource for NPRACH preamble transmission is always present at one side (one of 12, 24, 36, and 48 subcarriers) of 1RB in the relevant carrier.

Figure 11:
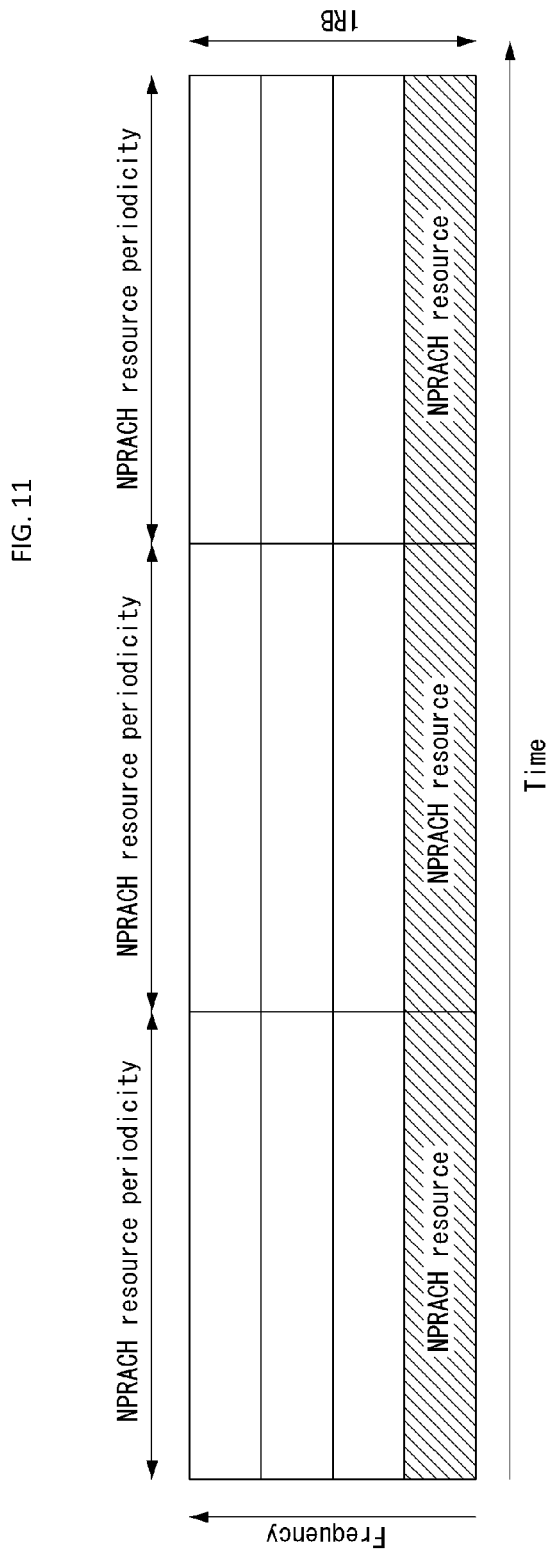
FIG. 11 is a view illustrating an example TDD NPRACH resource configuration.

FIG. 11 illustrates an example in which when the period is configured as 1280 ms, as much NPACH resource as 12 subcarriers is allocated.

Meanwhile, such an occasion may arise where the UE selects and transmits a subcarrier (i.e., NPRACH preamble) configured to be able to transmit the MSG3 multi-tones of the NPRACH resource.

At this time, if the base station configures the UE to be able to transmit 15 kHz 12-tones MSG3, the UE introduces the NPRACH resource upon transmitting MGG3.

Thus, to avoid such issue, the base station may configure the period of NPRACH resource.

However, since, although the base station sets the period, the UE picks an NPRACH resource from among the carriers bundled up at the same CE level based on its probability already known, it may not previously be aware of the period per resource or the number of subcarriers allocated to the resource.

Thus, such issues may be less likely but occur anyway and resolution may be attempted with the following methods.

(Method 1)

Method 1 is to configure different carriers for transmission of MSG1 and MSG3.

(Method 1-1) It may be configured to dynamically pick the carrier for transmission of MSG3 using, e.g., the reserved field or reserved state of RAR (grant) or DCI scheduling RAR.

This method has advantages in light of resource utilization since the base station may determine to dynamically configure different carriers.

Also this method is advantageous from a carrier load balancing standpoint because it may configure the UEs, which have transmitted MSG1 using the same NPRACH resource, to MSG3 on different carriers.

(1-2) It may be configured that carriers to transmit MSG3 are previously transferred independently per NPRACH resource via SIB2 or SIB22.

This method has advantages in that it may choose one from among more MSG3 carriers and transmit because it does not use RAR (grant) or DCI scheduling RAR (i.e., because the field is broader).

(1-3) Such an occasion may exist where the first MSG3 is transmitted on a different carrier from MSG1.

At this time, it may be configured that available carriers are previously transferred independently per NPRACH resource via SIB2 or SIB22, and MSG3 is transferred using 1 bit indicator to use a different UL carrier from MSG1 via RAR (grant) or DCI scheduling RAR.

Advantageously, this method may actively configure MSG3 to be transmitted on a different UL carrier from MSG1 under the determination of the base station and use only one bit field of RAR (grant) or DCI scheduling RAR.

(1-4) It may be configured that where NPRACH transmission is started in NPDCCH order, the UL carrier where the UE is performing UL unicast is used as the carrier for transmission of MSG3.

It may also be configured to add an indicator for configuring the carrier for transmission of MSG3 to use the UL carrier for legacy UL unicast to the reserved field of the DCI format (i.e., DCI format N1) for NPDCCH order.

It may be configured that if the indicator is set to be activated, the UL carrier for legacy UL unicast is used as the carrier for transmission of MSG3, otherwise MSG3 is transmitted on the same carrier as the carrier for MSG1 transmission.

Such an occasion may exist where a method for configuring the UL carrier for MSG1 transmission and the UL carrier for MSG3 transmission to differ from each other, such as 1-1, 1-2, or 1-3, has already been applied, and method 1-4 is added.

In this case, if the indicator is set to be deactivated, it may mean that an MSG3 transmission UL carrier is determined according to a preset method (e.g., 1-1, 1-2, or 1-3).

Use of this method has advantages in light of resource utilization since the base station may determine to dynamically configure different UL carriers.

Also this method is advantageous from a carrier load balancing standpoint because it may configure the UEs, which have transmitted MSG1 using the same NPRACH resource, to MSG3 on different UL carriers.

Although in the above-described methods, the UL carrier set for transmitting MSG3 may be configured to be the same as the UL carrier set for transmitting MSG1, this may be configured independently by the base station.

If configured to be the same as the UL carrier set, it provides the advantage that the UE already aware of the carriers capable of transmitting MSG1 need not further know the UL carrier set information for MSG3.

Where the base station configures the same independently, it is advantageous in light of carrier load balancing.

Further, it is preferable that the UL carrier set is transmitted via an SIB (e.g., SIB2 or SIB22).

(Method 2)

Method 2 is a method of configuring different UL grant interpretation methods included and transmitted in RAR for MSG3 transmission although the same carrier is used for transmission of MSG1 and MSG3.

(2-1) Such an occasion may exist where the UL grant included and transmitted in RAR may be indicated to transmit multi-tone MSG3 colliding with the NPRACH resource region.

At this time, the UE may be configured to determine that the UL grant is invalid and MSG1 retransmission or MSG3 retransmission is started.

Since it is enough to briefly specify UE operations in the specifications, this method is advantageous in light of specification work.

(2-2) It may be configured that the base station and UE transmit/receive MSG3 according to the reconfigured state by reconfiguring the subcarrier indication field that may collide with the NPRACH resource region.

That is, although the SC indication field for multi-tone MSG3 is currently configured as in Table 8, it may be reconfigured that the content of the field is reinterpreted according to the number of subcarriers used in the NPRACH resource.

For example, if the number of subcarriers used in the NPRACH resource is 12, and the NPRACH offset is 0 or 36, number state number 18 (15 kHz 12 tone) and state number 16 or 17 (6 tone) cannot be used.

At this time, if the base station has configured MSG3 transmission via state number 18, the UE may regard MSG3 transmission as being done via 9 tone and transmit Stone MSG3.

At this time, if the NPRACH offset is 0, it may be configured to transmit number 18 state using 9 tone of {3, 4, 5, 6, 7, 8, 9, 10, 11} and, if the NPRACH offset is 36, to transmit number 18 state using 9 tone of {0, 1, 2, 3, 4, 5, 6, 7, 8}.

Similarly, where NPRACH offset is 0, it may be configured that number 16 state is interpreted as $6(I_{SC}-16)+\{3, 4, 5, 6, 7, 8\}$ and number 17 state is interpreted as it is, (i.e., $6(I_{SC}-16)+\{0, 1, 2, 3, 4, 5\}$).

Further, where NPRACH offset is 36, it may be configured that number 17 state is interpreted as $6(I_{SC}-17)+\{3, 4, 5, 6, 7, 8\}$ and number 16 state is interpreted as it is, (i.e., $6(I_{SC}-16)+\{0, 1, 2, 3, 4, 5\}$).

It may be configured that similar methods may be applied to other cases so that different states are interpreted depending on the NPRACH offset number and SC number used in the NPRACH resource.

Further, this method may also be applied to the subcarrier indication field contained in the UL grant of DCI-format N0.

For example, it may be configured that if a look at the NPRACH resource-related parameter reveals that the subcarrier indication field value indicated with the UL grant collides with the NPRACH resource, the field may be reinterpreted as in the above-proposed methods and the NPUSCH is transmitted.

Use of this method provides the advantage that MSG3 multi-tone transmission may be efficiently multiplexed with MSG1 resource pre-configured, although MSG1 and MSG3 use the same carrier.

Additionally, similar issues (i.e., search space overlap or NPDSCH transmission overlap) may arise upon MSG2 (RAR) reception and MSG4 reception.

Thus, it stands to reason that they may also be applied to methods of configuring MSG2 and MSG4 DL carriers.

Further, if the UE selects one more time the NPRACH resource for MSG1 transmission, MSG2, MSG3, and MSG4 carriers may be independently configured which need to be used until the procedure is done.

For example, it is possible to independently configure MSG2 reception carriers, and/or MSG3 transmission carriers, and/or MSG4 reception carriers per NPRACH resource or per MSG1 transmission carrier.

This method also provides the advantage that the base station may perform carrier load balancing at its own discretion.

Next, a method of transmitting a message for performing a random access procedure proposed herein is described below in detail with reference to FIGS. 12 and 13.

Figure 12:
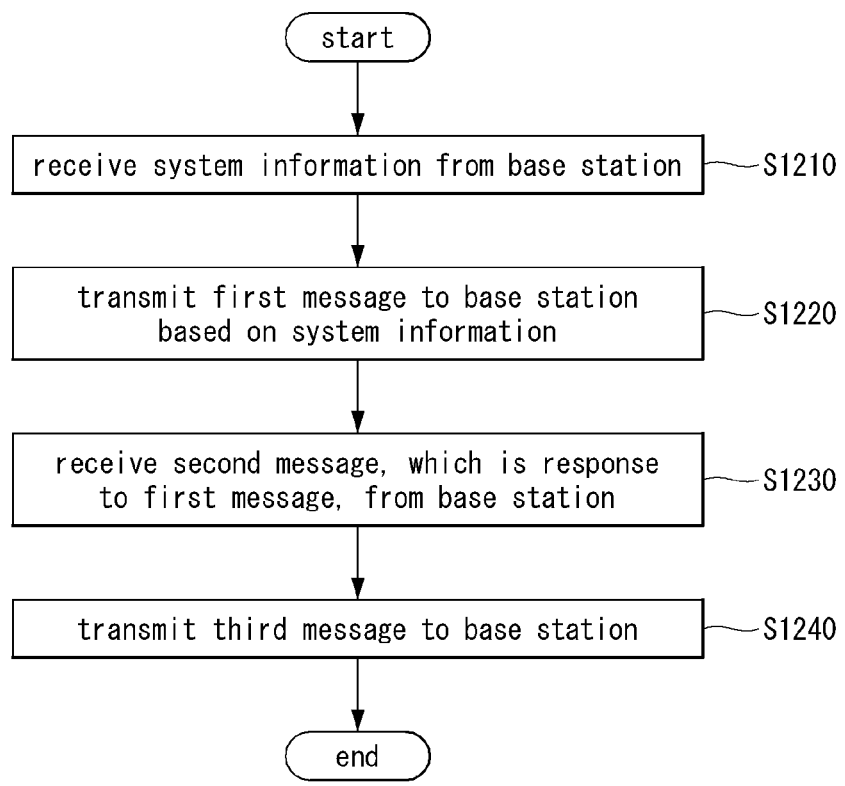
FIG. 12 is a flowchart illustrating an operation process by a UE to transmit a message for performing a random access procedure according to an embodiment of the disclosure.

FIG. 12 is a flowchart illustrating an example operation method of a UE performing a method of transmitting a message for performing a random access procedure proposed in the disclosure.

First, the UE receives system information (SIB) from the base station (S1210).

Thereafter, the UE transmits a first message to the base station based on the system information (S1220).

At this time, the first message may correspond to a preamble.

Next, the UE receives a second message, which is a response to the first message, from the base station (S1230).

Thereafter, the UE transmits a third message to the base station (S1240).

At this time, the third message may be transmitted using a carrier different from the carrier used to transmit the first message.

Further, the UE may receive downlink control information (DCI) from the base station through a physical downlink control channel (NPDCCH)

Further, the carrier for transmission of the third message may be configured via the system information.

Further, the carrier for transmission of the third message may be configured via the DCI or second message.

Further, the system information may include information for resources where the third message is transmittable and, based on the information, the carrier where the third message is transmitted may be configured via the DCI or the second message.

Further, the NPDCCH may be one for unicast transmission. At this time, the third message may be transmitted using the carrier used for uplink unicast.

Figure 13:
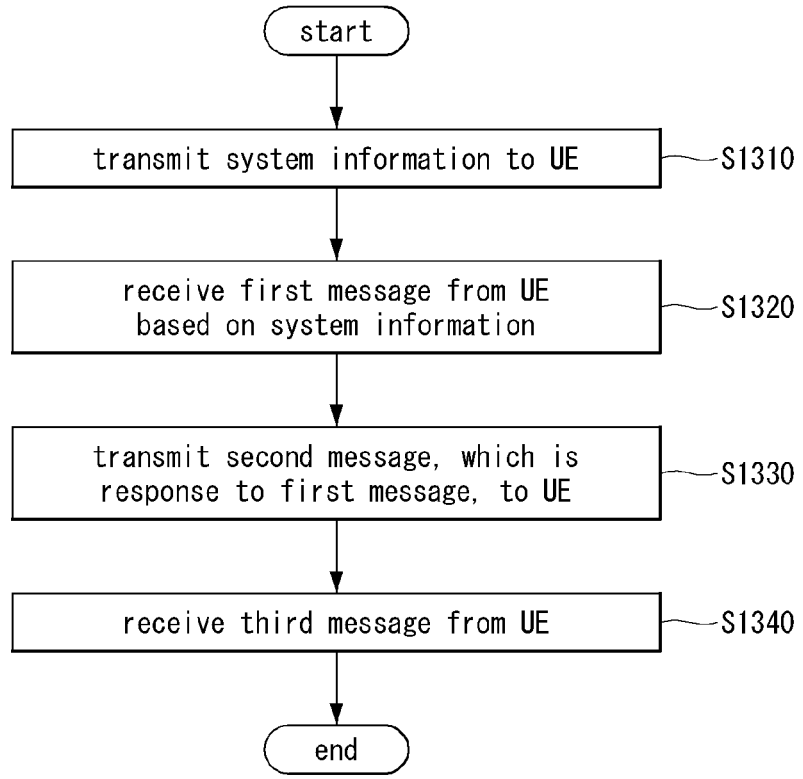
FIG. 13 is a flowchart illustrating an operation process by a base station to transmit a message for performing a random access procedure according to an embodiment of the disclosure.

FIG. 13 is a flowchart illustrating an example operation method of a base station performing a method of transmitting a message for performing a random access procedure proposed in the disclosure.

First, system information is transmitted to the UE (S1310).

Next, the base station receives a first message from the UE based on the system information and transmits a second message, which is a response to the first message, to the UE (S1320 and S1330).

Next, the base station receives a third message from the UE (S1340).

Devices to which the Disclosure May Apply

Figure 14:
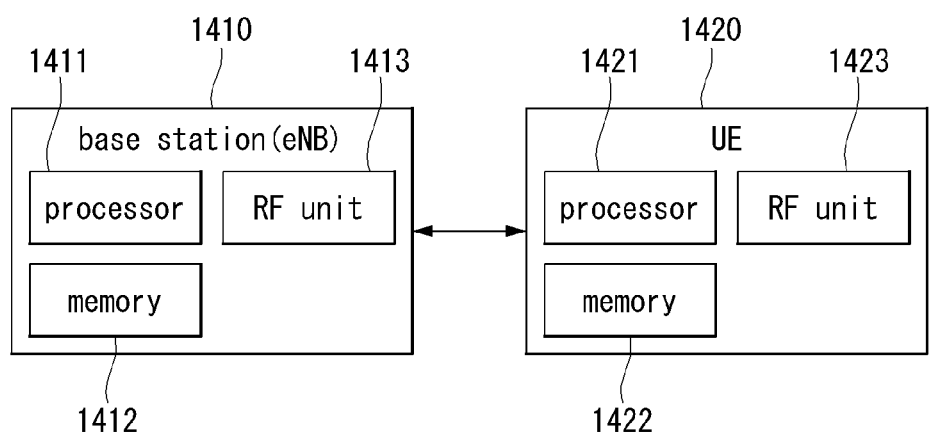
FIG. 14 is a block diagram illustrating a configuration of a wireless communication device according to an embodiment of the disclosure.

FIG. 14 is a block diagram illustrating a configuration of a wireless communication device according to an embodiment of the disclosure.

Referring to FIG. 14, a wireless communication system includes a base station 1410 and a plurality of UEs 1420 positioned in the coverage of the base station 1410.

The base station 1410 includes a processor 1411, a memory 1412, and a radio frequency (RF) unit 1413. The processor 1411 implements the functions, processes or steps, and/or methods proposed above in connection with FIGS. 1 to 13.

Wireless interface protocol layers may be implemented by the processor 1411.

The memory 1412 is connected with the processor 1411 to store various pieces of information for driving the processor 1411.

The RF unit 1413 is connected with the processor 1411 to transmit and/or receive wireless signals.

The UE 1420 includes a processor 1421, a memory 1422, and an RF unit 1423.

The processor 1421 implements the functions, processes or steps, and/or methods proposed above in connection with FIGS. 1 to 13.

Wireless interface protocol layers may be implemented by the processor 1421.

The memory 1422 is connected with the processor 1421 to store various pieces of information for driving the processor 1421.

The RF unit 1423 is connected with the processor 1421 to transmit and/or receive wireless signals.

The memory 1412 and 1422 may be positioned inside or outside the processor 1411 and 1421 and be connected with the processor 1411 and 1421 via various known means.

The base station 1410 and/or the UE 1420 may include a single or multiple antennas.

The above-described embodiments regard predetermined combinations of the components and features of the disclosure. Each component or feature should be considered as optional unless explicitly mentioned otherwise. Each component or feature may be practiced in such a manner as not to be combined with other components or features. Further, some components and/or features may be combined together to configure an embodiment of the disclosure. The order of the operations described in connection with the embodiments of the disclosure may be varied. Some components or features in an embodiment may be included in another embodiment or may be replaced with corresponding components or features of the other embodiment. It is obvious that the claims may be combined to constitute an embodiment unless explicitly stated otherwise or such combinations may be added in new claims by an amendment after filing.

The embodiments of the disclosure may be implemented by various means, e.g., hardware, firmware, software, or a combination thereof. When implemented in hardware, an embodiment of the disclosure may be implemented with, e.g., one or more application specific integrated circuits (ASICs), digital signal processors (DSPs), digital signal processing devices (DSPDs), programmable logic devices (PLDs), field programmable gate arrays (FPGAs), processors, controllers, micro-controllers, or micro-processors.

When implemented in firmware or hardware, an embodiment of the disclosure may be implemented as a module, procedure, or function performing the above-described functions or operations. The software code may be stored in a memory and driven by a processor. The memory may be positioned inside or outside the processor to exchange data with the processor by various known means.

It is apparent to one of ordinary skill in the art that the disclosure may be embodied in other specific forms without departing from the essential features of the disclosure. Thus, the above description should be interpreted not as limiting in all aspects but as exemplary. The scope of the disclosure should be determined by reasonable interpretations of the appended claims and all equivalents of the disclosure belong to the scope of the disclosure.

INDUSTRIAL AVAILABILITY

Although the method of transmitting a message for performing a random access procedure in the wireless communication system according to the disclosure has been described in connection with examples in which it applies to 5G systems (new RAT systems), the scheme is also applicable to other various wireless communication systems.

The invention claimed is:

1. A method performed by a user equipment (UE) for a random access procedure in a wireless communication system, the method comprising:
receiving a system information block (SIB) from a base station, wherein the SIB includes time division duplex (TDD) uplink-downlink configuration information for a serving cell of the UE and information on uplink subcarrier spacing (SCS) supported in the serving cell;
transmitting a first message to the base station based on the TDD uplink-downlink configuration information and the uplink SCS of the SIB, the first message being a random access preamble;
receiving a second message from the base station, the second message being a response to the first message; and
transmitting a third message to the base station using a carrier different from a carrier used to transmit the first message,
wherein the uplink SCS of the serving cell is determined depending on the TDD uplink-downlink configuration information of the serving cell, and
wherein i) payload size of scheduling information for resource allocation of the third message in the second message and ii) the number of subcarriers used for transmitting the third message are determined based on the uplink SCS.

2. The method of claim 1, further comprising:
before transmitting the first message, receiving downlink control information (DCI) from the base station through a physical downlink control channel (PDCCH).

3. The method of claim 2, wherein the carrier to transmit the third message is configured by the DCI or the second message.

4. The method of claim 1, wherein the carrier to transmit the third message is configured by the SIB.

5. The method of claim 2, wherein the SIB includes information for resources where the third message is transmittable, and
wherein the carrier to transmit the third message is determined by the DCI or the second message, based on the information for resources where the third message is transmittable.

6. The method of claim 2, wherein the PDCCH is for unicast transmission, and
wherein, based on transmission of the first message being triggered by the DCI, the third message is transmitted using a carrier used for uplink unicast.

7. A user equipment (UE) configured to perform a random access procedure in a wireless communication system, the UE comprising:

a radio frequency (RF) module for transmitting/receiving a radio signal; and
a processor functionally connected with the RF module, wherein the processor is configured to:
receive a system information block (SIB) from a base station, wherein the SIB includes time division duplex (TDD) uplink-downlink configuration information for a serving cell of the UE and information on uplink subcarrier spacing (SCS) supported in the serving cell;
transmit a first message to the base station based on TDD uplink-downlink configuration information and the uplink SCS of the SIB, the first message being a random access preamble;
receive a second message from the base station, the second message being a response to the first message; and
transmit a third message to the base station using a carrier different from a carrier used to transmit the first message,
wherein the uplink SCS of the serving cell is determined depending on the TDD uplink-downlink configuration information of the serving cell, and
wherein i) payload size of scheduling information for resource allocation of the third message in the second message and ii) the number of subcarriers used for transmitting the third message are determined based on the uplink SCS.

8. The UE of claim 7, wherein the processor receives downlink control information (DCI) from the base station through a physical downlink control channel (PDCCH).

9. The UE of claim 8, wherein the carrier to transmit the third message is configured by the DCI or the second message.

10. The UE of claim 7, wherein the carrier to transmit the third message is configured by the SIB.

11. A method performed by a base station for a random access procedure in a wireless communication system, the method comprising:
transmitting a system information block (SIB) to a user equipment (UE), wherein the SIB includes time division duplex (TDD) uplink-downlink configuration information for a serving cell of the UE and information on uplink subcarrier spacing (SCS) supported in the serving cell;
receiving a first message from the UE based on the TDD uplink-downlink configuration information and the uplink SCS of the SIB, the first message being a random access preamble;
transmitting a second message to the UE, the second message being a response to the first message; and
receiving a third message from the UE using a carrier different from a carrier used to receive the first message,
wherein the uplink SCS of the serving cell is determined depending on the TDD uplink-downlink configuration information of the serving cell, and
wherein i) a payload size of scheduling information for resource allocation of the third message in the second message and ii) the number of subcarriers used for transmitting the third message are determined based on the uplink SCS.

12. A base station configured to perform a random access procedure in a wireless communication system, the base station comprising:
a radio frequency (RF) module for transmitting/receiving a radio signal; and
a processor functionally connected with the RF module, wherein the processor is configured to:
transmit a system information block (SIB) to a user equipment (UE), wherein the SIB includes time division duplex (TDD) uplink-downlink configuration information for a serving cell of the UE and information on uplink subcarrier spacing (SCS) supported in the serving cell;
receive a first message from the UE based on the TDD uplink-downlink configuration information and the uplink SCS of the SIB, the first message being a random access preamble;
transmit a second message to the UE, the second message being a response to the first message; and
receive a third message from the UE using a carrier different from a carrier used to receive the first message,
wherein the uplink SCS of the serving cell is determined depending on the TDD uplink-downlink configuration information of the serving cell, and
wherein i) payload size of scheduling information for resource allocation of the third message in the second message and ii) the number of subcarriers used for transmitting the third message are determined based on the uplink SCS.

* * * * *